United States Patent
Gonzalez et al.

(10) Patent No.: US 12,306,042 B2
(45) Date of Patent: May 20, 2025

(54) RANDOM RING PHOTONIC INTEGRATED CIRCUIT SPECTROMETER

(71) Applicant: University of Rochester, Rochester, NY (US)

(72) Inventors: Jaime Cardenas Gonzalez, Rochester, NY (US); Xiaotong He, Rochester, NY (US)

(73) Assignee: UNIVERSITY OF ROCHESTER, Rochester, NY (US)

( * ) Notice: Subject to any disclaimer, the term of this patent is extended or adjusted under 35 U.S.C. 154(b) by 145 days.

(21) Appl. No.: 18/028,410

(22) PCT Filed: Oct. 12, 2021

(86) PCT No.: PCT/US2021/054491
§ 371 (c)(1),
(2) Date: Mar. 24, 2023

(87) PCT Pub. No.: WO2022/081520
PCT Pub. Date: Apr. 21, 2022

(65) Prior Publication Data
US 2023/0366735 A1 Nov. 16, 2023

Related U.S. Application Data

(60) Provisional application No. 63/091,650, filed on Oct. 14, 2020.

(51) Int. Cl.
*G01J 3/02* (2006.01)
*G01J 3/12* (2006.01)
*G01J 3/28* (2006.01)

(52) U.S. Cl.
CPC .......... *G01J 3/0297* (2013.01); *G01J 3/2803* (2013.01); *G01J 3/0205* (2013.01); *G01J 3/0256* (2013.01);
(Continued)

(58) Field of Classification Search
CPC ............... G01J 3/0297; G01J 3/2803; G01J 2003/1269; G01J 3/0205; G01J 3/0256; G01J 3/0286; G01J 3/28
(Continued)

(56) References Cited

U.S. PATENT DOCUMENTS 11,846,545 B2 * 12/2023 Antonacci ................. G01J 3/12
2007/0109550 A1 * 5/2007 Ja .............................. G01J 3/26
356/480

(Continued)

FOREIGN PATENT DOCUMENTS

WO WO-2017/147514 A1 8/2017
WO WO-2020/084466 A1 4/2020

OTHER PUBLICATIONS

Hamamatsu Photonics K.K., Solid State Division. (n.d.). InAsSb photovoltaic detector. In InAsSb Photovoltaic Detector. Sep. 2018. (Year: 2018).*

(Continued)

*Primary Examiner* — Tarifur R Chowdhury
*Assistant Examiner* — Kaitlyn E Kidwell
(74) *Attorney, Agent, or Firm* — Ping Wang; Kalos Athena Wang PLLC

(57) ABSTRACT

An integrated optical spectrometer includes an optical bus configured to accept a light to be measured. Each ring resonator of an array of integrated ring resonators and detectors is optically coupled to the optical bus and to at least one detector. A matrix multiplication process is operatively coupled to each detector. The matrix multiplication process determines based on data from the array of integrated ring resonators and detectors and a calibration matrix of the array of integrated ring resonators and detectors, a spectral content of the light to be measured. A method of calibrating and operating an integrated optical spectrometer, (Continued)

a method to generate a calibration matrix for a ring array of a photonic integrated circuit (PIC) spectrometer, and a method for spectrum reconstruction for a photonic integrated circuit (PIC) spectrometer are also described.

15 Claims, 33 Drawing Sheets

(52) U.S. Cl.
CPC ..... *G01J 3/0286* (2013.01); *G01J 2003/1269* (2013.01); *G01J 3/28* (2013.01)

(58) Field of Classification Search
USPC ......................................... 356/326
See application file for complete search history.

(56) References Cited

U.S. PATENT DOCUMENTS

| 2013/0279849 A1 | 10/2013 | Santori et al. |
| 2015/0211922 A1 | 7/2015 | Yu |
| 2020/0280173 A1 | 9/2020 | Gao et al. |

OTHER PUBLICATIONS

Teledyne Judson Technologies LLC, Germanium Detector and Position Sensors, J16 Germanium Detector Operating Notes. Aug. 2004. (Year: 2004).*
Zheng, S.N., Zou, J., Cai, H. et al. Microring resonator-assisted Fourier transform spectrometer with enhanced resolution and large bandwidth in single chip solution. Nat Commun 10, 2349 (2019). (Year: 2019).*
Bogaerts et al. Silicon microring resonators. (2012). In Laser Photonics Rev. (vols. 1-1, pp. 47-73). (Year: 2011).*
Kita, D. M., Lin, H., Agarwal, A., Richardson, K., Luzinov, I., Gu, T., & Hu, J. (2016). On-Chip Infrared Spectroscopic Sensing: Redefining the benefits of scaling. IEEE Journal of Selected Topics in Quantum Electronics, (Year: 2016).*
Demonstration of a compressive-sensing Fourier-transform on-chip spectrometer by Podmore et al annotated with added reference numbers (Year: 2017).*
Podmore, H., et al., "Demonstration of a compressive-sensing Fourier-transform on-chip spectrometer", Optics Letters, vol. 42, No. 7, Apr. 1, 2017 (p. 1440).
ISA/EPO International Search Report and Written Opinion for corresponding International Application No. PCT/US2021/054491 dated Jan. 1, 2022 (18 pages).

* cited by examiner

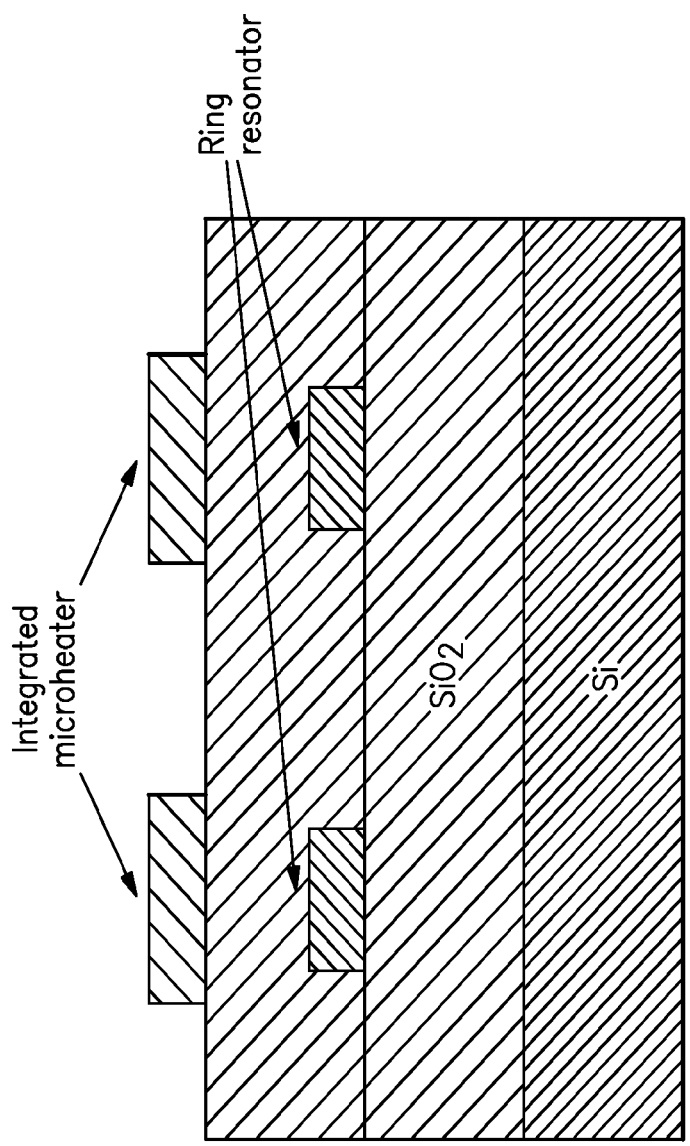

Compressed sensing $$I(x,\lambda) = \int T(x,\lambda)S(\lambda)d\lambda$$

Discretization $$I_j = T_{ji}S_i$$

$$I_M = T_{M \times N}S_N$$

M<<N Equations<<Unknows
Underdetermined matrix

Spectral discretization produces spectral channels centered at $\lambda_j$ and spaced by $d\lambda$. if $d\lambda = \delta\lambda$, the spectral channels are independent.

pseudo-inverse (ill conditioned by noise) $S = T^{-1}I$
optimization problem minimization of $\|I - TS\|_2$ compressed sensing $\|x\|_0 \rightarrow \|x\|_1$ → convex optimization package in matlab $l_1$ norm minimization

```
cvx_begin
    variable x(range/delta,1);
    minimize(norm(x,1));
    subject to
        bm*x-ringresu==0
cvx_end
```

FIG.13

Number of M

Theorem 1 [6]

Given $x \in R^n$ and suppose $x$ is $r$-sparse in basis $\Psi$. Select $m$ measurements in the $\Phi$ domain uniformly at random via (2.2) (that is, the $m$ testing vectors $\{\varphi_j^T, i=1,2,...,m\}$ are $m$ rows uniformly randomly selected from matrix $\Phi$). If $$m \geq C \cdot \mu^2(\Phi, \Psi) \cdot r \cdot \log n \qquad (2.3)$$

Even better, there is a *four-to-one* practical rule which says that for exact reconstruction, one needs about *four incoherent measurements per unknown nonzero term in x*:

$$m \geq 4r \qquad (2.6)$$

2. SNR>>100

FIG.29

RANDOM RING PHOTONIC INTEGRATED CIRCUIT SPECTROMETER

CROSS-REFERENCE TO RELATED APPLICATIONS

This application claims priority to and the benefit of U.S. provisional patent application Ser. No. 63/091,650, RANDOM RING PHOTONIC INTEGRATED CIRCUIT SPECTROMETER, filed Oct. 14, 2020, which application is incorporated herein by reference in its entirety.

FIELD OF THE APPLICATION

The application relates to optical spectrometers, particularly to photonic integrated circuit spectrometers.

BACKGROUND

Optical spectrometers are important across the fields of engineering and science to measure the spectra of light. Typically, the light to be measured is coupled to an input of the spectrometer. The light might be transmitted from a telescope, originating from some distant point in space. Or, the light could be transmitted or reflected light from a led or laser in performing a spectral analysis of a solid, liquid, or gas sample.

SUMMARY

An integrated optical spectrometer includes an optical bus configured to accept a light to be measured. Each ring resonator of an array of integrated ring resonators and detectors is optically coupled to the optical bus and to at least one detector. A matrix multiplication process is operatively coupled to each detector. The matrix multiplication process determines based on data from the array of integrated ring resonators and detectors and a calibration matrix of the array of integrated ring resonators and detectors, a spectral content of the light to be measured.

The matrix multiplication process can include an operation of decomposing an incoming spectrum of light into a linear combination of ring resonator modes. The matrix multiplication process can include a deterministic spectrum retrieval process algorithm. A compressed sensing algorithm, a number of ring resonators, and a sparsity of input spectrum can determine a resolution and a spectral range of the integrated optical spectrometer.

The integrated optical spectrometer can include a broad spectral range mode based on an aliased modal decomposition process.

The integrated optical spectrometer can include a narrow spectral range high resolution mode by lining up resonances of ring resonators of the array of integrated ring resonators and detectors to sample a spectrum at a resolution of a resonance line-width.

The integrated optical spectrometer can further include a plurality of micro heaters. In a zoom mode, a plurality of ring resonator resonances can be tuned by the micro heaters to sample a spectrum across a resonator spectral range at high resolution. Each micro heater can be disposed directly above a ring resonator waveguide. Each micro heater can be disposed far enough from a ring resonator waveguide so that the micro heater substantially does not contribute an optical loss from absorption due to modal interaction with a heater metal of the micro heater.

The integrated optical spectrometer can include a CMOS compatible photonic platform based on silicon nitride. The integrated optical spectrometer can further include silicon dioxide, silicon, and germanium.

The integrated optical spectrometer can include integrated silicon photodetectors responsive to a visible range from about 400 nm to 1000 nm. The integrated optical spectrometer can include germanium detectors responsive to a visible NIR range from about 1000 nm to 1600 nm. The integrated optical spectrometer can include InAsSb detectors responsive to a visible range from about 1600 nm to 4000 nm.

A method of calibrating and operating an integrated optical spectrometer includes: providing an optical bus configured to accept a light to be measured, and an array of integrated ring resonators and detectors, each ring resonator optically coupled to the optical bus and each ring resonator optically coupled to at least one detector; generating a calibration matrix for the array of integrated ring resonators and detectors by scanning at least once, a wavelength of the light to be measured with a spectral channel interval a and decomposing an incoming spectrum of light into a linear combination of ring resonator modes to determine a spectral content of the light to be measured based on data from each detector of the array of integrated ring resonators and detectors and the calibration matrix.

The step of decomposing can further include in a zoom mode, tuning by micro heaters a plurality of ring resonator resonances to sample a spectrum across a resonator spectral range at high resolution.

A method to generate a calibration matrix for a ring array of a photonic integrated circuit (PIC) spectrometer includes: determining a spectrometer working wavelength and bandwidth; determining a scanning interval $d\lambda$ by the full width half maximum (FWHM) of a spectral correlation function; tuning a wavelength tunable light source or a wavelength selectable light source to a starting wavelength $\lambda_0$ with one unit of power, where a bandwidth of the tunable laser is be smaller than a; recording data from the detectors, which data forms a first column of a calibration matrix; tuning the wavelength tunable light source or a wavelength selectable light source to a wavelength of $\lambda_0+d\lambda$, with the same amount of power; recording data from the detectors, which data forms a next column of the calibration matrix; repeating the measurements of tuning the wavelength tunable light source or a wavelength selectable light source to a wavelength of $\lambda_0+d\lambda$ and recording data from the detectors to an end wavelength to complete the calibration matrix.

A method for spectrum reconstruction for a photonic integrated circuit (PIC) spectrometer includes: providing an integrated optical spectrometer including an optical bus configured to accept a light to be measured, an array of integrated ring resonators and detectors, where each ring resonator is optically coupled to the optical bus and to at least one detector; and reconstructing a spectrum of the light to be measured by use of a compressed sensing process.

The step of reconstructing a spectrum of the light can include: providing an integrated optical spectrometer including an optical bus configured to accept a light to be measured, an array of integrated ring resonators and detectors, where each ring resonator is optically coupled to the optical bus and to at least one detector; solving the equation $I_M=T_{M=N}x_N$, by finding a solution x that is most similar to original input, where T is the calibration matrix, and I is the data from detector array; determining if an input spectrum of the light to be measured is originally sparse or not, where sparsity is defined as a number of nonzero elements in the input vector; if the input spectrum only has few discrete narrow band frequencies, finding the sparest solution by solving min $\|x\|_1$, or if the input spectrum is broadband, converting x into a sparse vector tin wavelet domain $x=Wt$ by use of a wavelet transform.

A method to generate a calibration matrix for a ring array of a photonic integrated circuit (PIC) spectrometer includes: providing an optical bus configured to accept a light to be measured, and an array of integrated ring resonators and detectors, each ring resonator optically coupled to said optical bus and each ring resonator optically coupled to at least one detector; and generating a calibration matrix for said array of integrated ring resonators and detectors by use of a light source.

The light source can be any suitable light source, including, for example, a supercontinuum source, one or more LEDs, or even a sodium lamp and equivalent.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 4 is a drawing showing exemplary integrated microheaters which enable resonance tuning by passing a current through a resistive element;

FIG. 13 is a drawing showing exemplary modeling of compressed sensing with exemplary code;

FIG. 29 is a drawing showing Theorem 1;

DETAILED DESCRIPTION

Figure 1A:
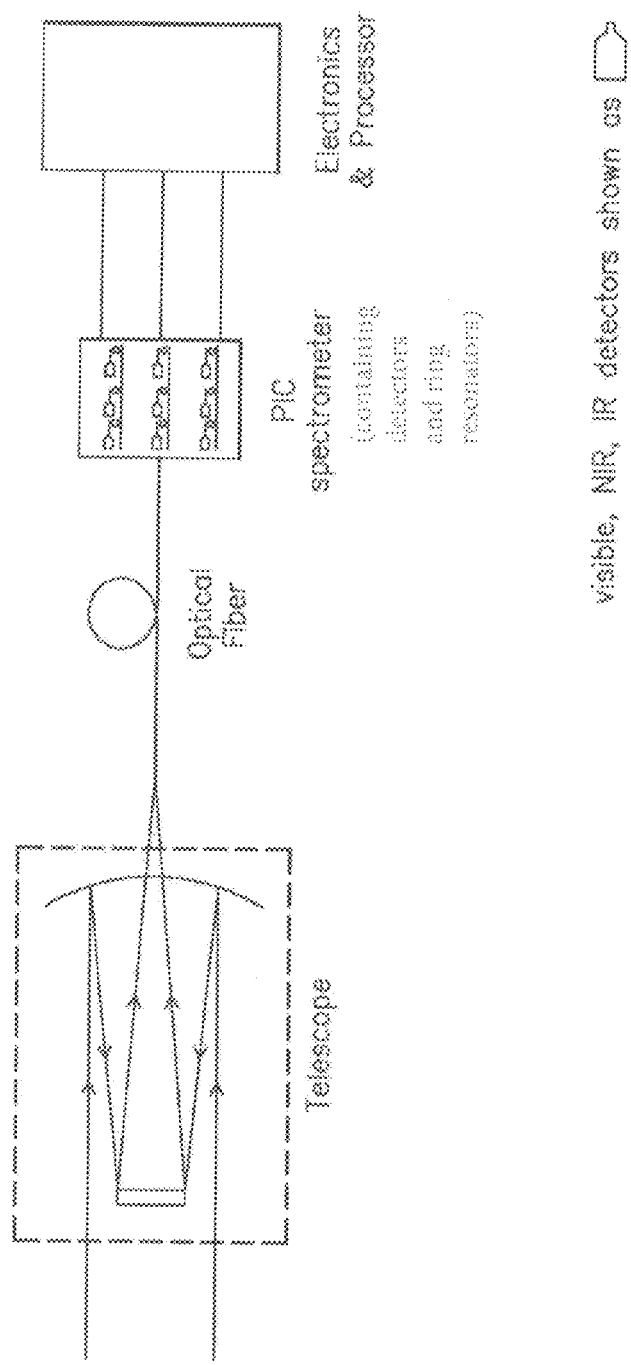
FIG. 1A is a drawing showing a block diagram of an exemplary photonic integrated (PIC) spectrometer according to the Application.

As described hereinabove, optical spectrometers are important across the fields of engineering and science to measure the spectra of light. Typically, the light to be measured is coupled to an input of the spectrometer. The light may be transmitted from a telescope, originating from some distant point in space, or a transmitted or reflected light from a led or laser in performing a spectral analysis of a solid, liquid, or gas sample.

Spectrometers represent a key science instrument that, for example, in the field of astronomy allow us to determine the composition of objects, how fast they are moving, or, for example, in some astrophysics application, if an object is orbiting a star. Some open questions in astrophysics where spectrometers can play a key role, are whether there are Earth-like planets orbiting nearby stars and in astrobiology, whether there is life on other planets.

State of the art spectrometers for space-flight applications typically are built using large and bulky free space optical components. For example, NASA recently launched the Compact Reconnaissance Imaging Spectrometer for Mars (CRISM) based on free space optical components. Using free space optical components allows CRISM to cover a broad spectral range from 362 nm to 3920 nm wavelength range. One common engineering trade-off with spectrometers is that resolution and spectral range come at the expense of size and consequently weight.

An on-chip spectrometer could significantly reduce the size, weight, and power and increase the ruggedness of science instruments for space based missions. Space based instruments should stay aligned after the rough, high vibration environment experienced during a launch. Their performance should not degrade as a consequence of the vibrations and the instrument must be able to cope with the rigors of operating in space or in the environment of other planets, asteroids, or moons. On-chip instruments have no moving parts and radiation hardened materials may be used. In addition, a small chip may be much easier to shield from radiation than large instruments. Similarly, the amount of power required to keep a small chip at a specific temperature is much smaller than stabilizing the temperature of a large instrument, thereby reducing the needed power for operation.

Current state of the art demonstrations of on-chip spectrometers have shown high resolving power over a bandwidth of a few tens of nanometers. On-chip spectrometers based on Echelle gratings, for example, have shown ~10 nm of spectral range with a resolution of ~0.1 to 0.5 nm (resolving power ~$10^4$). Optical cavities based on microresonators or photonic crystals have shown similar performance. Fourier transform on-chip spectrometers based on interferometers or stationary waves achieve resolving powers of $10^4$ over similarly narrow spectral ranges. A new class of spectrometers based on speckle patterns using multimode optical fibers (i.e. not on-chip) and imaging systems have achieved larger spectral ranges of a couple hundred nanometers with resolving powers up to $10^5$.

This Application describes a new ultralow power photonic integrated (PIC) spectrometer with a broad spectral range from 400 nm to 4000 nm. The PIC spectrometer of the Application can be operated in a high resolution (resolving power of $10^5$ to $10^6$) narrow spectral range, "zoom," mode. The spectrometer, with monolithically and heterogeneously integrated photodetectors, is fully CMOS compatible thereby enabling synergy with the CMOS manufacturing infrastructure and integration with CMOS electronics. The miniature spectrometer reduces the size and weight of typical spectrometer instruments from ~1,000 cm$^3$ and a few kilograms (5 kg) to ~100 mm$^3$ and a few grams.

The photonic integrated (PIC) spectrometer according to the Application generally differs from existing spectrometers based on integrated ring resonators in a number of ways. One important difference is that many spectrometers of the prior art use ring resonators as dispersive components. The free spectral range (FSR) of the rings defines the bandwidth of spectrometer, and the quality factor defines the spectral space. One spectral channel (or one detector) only responds to one particular wavelength. Therefore, such spectrometer devices that use ring resonators as dispersive components require high fabrication accuracy for high Q and precise location of resonances for each ring.

By contrast, the new PIC Spectrometer of the Application uses the different response pattern of many rings and detectors as an array of rings and detectors. As described in more detail hereinbelow, the output or measurement made by each detector of each of the rings of the array is considered by a matrix multiplication process of the new spectrometer, even for the case of an input monochromatic light.

The matrix multiplication process of the PIC Spectrometer determines the spectra of the light input to the spectrometer in response to a plurality of rings and detectors, typically the entire ring array. The process for determining the spectrum can include a matrix multiplication. By solving the multiplication, the original spectrum can be determined. One advantage of the PIC Spectrometer method is that the number of detectable spectral channels is far higher than the number of detectors. As for this property, the matrix to solve becomes an underdetermined system. Compressed sensing methods can be used to solve this problem (See for example, Opt. Lett. 42, 1440-1443 (2017)). Because the response of the detector array is different for different wavelength, random ring radii along with random resonances help to reduce the inner product of different columns of calibration matrix. The selection of ring radius sets involves overall size and variance, which defines a range of radius. And the radius is randomly selected from that range. By changing that selection and monitoring the error of reconstructed spectrum in our simulation code, we can find the target ring numbers and a proper set of radius.

Random rings—As it turns out, no matter how precise ring resonators are specified for semiconductor fabrication, there is always some variation in post-production PICs, both variation from each other (ring to ring), as well as variation from the exact design specification (e.g. design center 2 and Q). We realized that we could exploit that very variation in exact ring parameters which otherwise limits spectrometer instrument performance of the prior art, by combining a first order design specification of ring sizes with processes which consider a plurality of rings and their corresponding detectors, as described hereinabove. The new process of the Application works in part by generating, post production, a calibration matrix for each PIC spectrometer. That is, physical ring structures are specified at the time of manufacture to have the desired range of wavelengths and overlap. However, in practice, there is some variation in manufactured rings, especially each specific actual post production ring resonant frequency and Q. Therefore, the economy and precision of a PIC spectrometer according to Application is realized in part because following the initial PIC fabrication a calibration process provides a unique calibration matrix for each specific instrument's PIC.

Figure 1B:
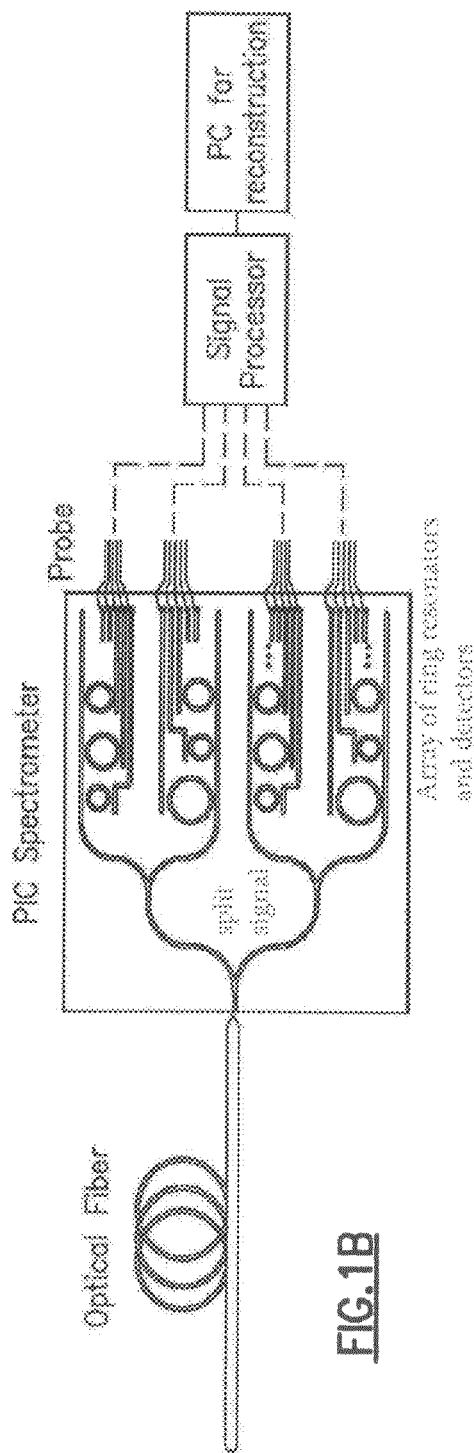
FIG. 1B is a drawing showing a block diagram of an exemplary implementation of a photonic integrated (PIC) spectrometer according to the Application including a processor.
Figure 1C:
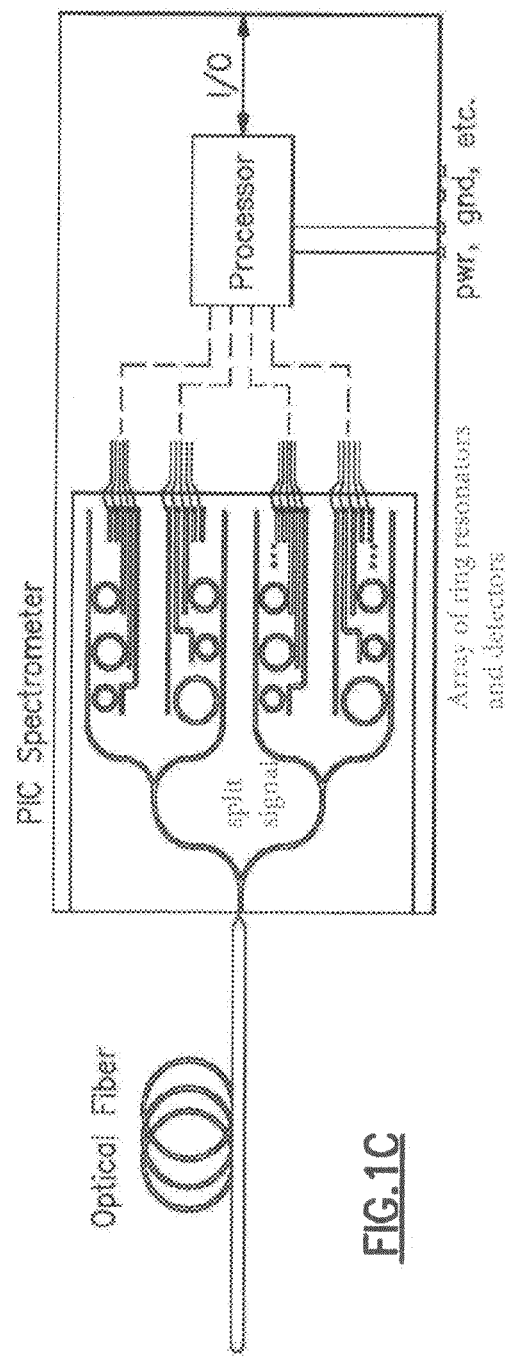
FIG. 1C is a drawing showing a block diagram of an exemplary implementation of a photonic integrated (PIC) spectrometer as a system on a chip.

FIG. 1A is a drawing showing a block diagram of an exemplary PIC spectrometer according to the Application for use with a terrestrial or spaceborne telescope. FIG. 1B is a drawing showing a block diagram of an exemplary implementation of a photonic integrated (PIC) spectrometer according to the Application including a processor. For example, in the exemplary implementation of FIG. 1B, some of reconstruction processes were run on a separate computer. However, the PIC spectrometer of the Application can also be manufactured as a system on a chip, such as is shown in FIG. 1C, where some or all of the processes can be performed by a processor on a monolithic chip (e.g. where CMOS compatible fabrication process methods are used), or on a separate bonded chip, such as for example in a PIC spectrometer system provided in a hybrid package. For simplicity, the ring array drawing was copied from FIG. 1B, however, typically the detectors are physically disposed above, below, or aside each ring, where for example, each ring is evanescently coupled to at least one ring. Other suitable configurations include, for example, rings disposed at the edge of the chip or substrate and/or with any suitable optical coupling (other than evanescent coupling) between each ring and one or more detectors. Where the spectral range of one or more rings span the detection range of an individual type of detector, there can be two or more detectors optically coupled to a ring to cover the entire desired spectral range (not shown in FIG. 1A to FIG. 1C).

A photonic integrated circuit (PIC) spectrometer according to the Application can be built with on-chip detectors. To facilitate deployment of the developed technology to future spaceborne instruments, existing CMOS manufacturing infrastructure can be used to fabricate the PICs at an integrated photonics facility, such as, for example, at the Institute for Manufacturing Innovation (AIM Photonics). One exemplary PIC spectrometer according to the Application can include, for example, integration of the electronics with a photonic integrated circuit onto a fully packaged device. Suitable processes include, for example, a monolithic or 2.5D platform such as with the AIM Photonics interposer and AIM Photonics packaging offerings.

PIC Spectrometer—A new broad spectral range spectrometer with a narrow, high-resolution "zoom" capability based on an array of ring resonator cavities is now described in more detail. In some embodiments, a PIC spectrometer can operate in either the broad or "zoom" mode depending on how the ring resonator cavities are controlled. In a broad spectral range mode, the spectrometer is passive and only the photodetectors consume a minimal amount of power. In a "zoom" mode, the device is active and consumes power by actively tuning the ring resonator cavities.

The broad spectral range mode operates on the principle of aliased modal decomposition. While typical spectrometers use a dispersive or interferometric element for sampling the spectral content of signals, more recent instruments have instead used the spatial modes of multimode optical fibers and the coupling of different wavelengths of light to the different modes as a means to sample the spectral content.

The PIC spectrometer of the Application takes this concept further by using the resonance modes of an array of ring resonators to sample the spectral content and recover the spectrum through electronic processing.

Figures 2A, 2B:
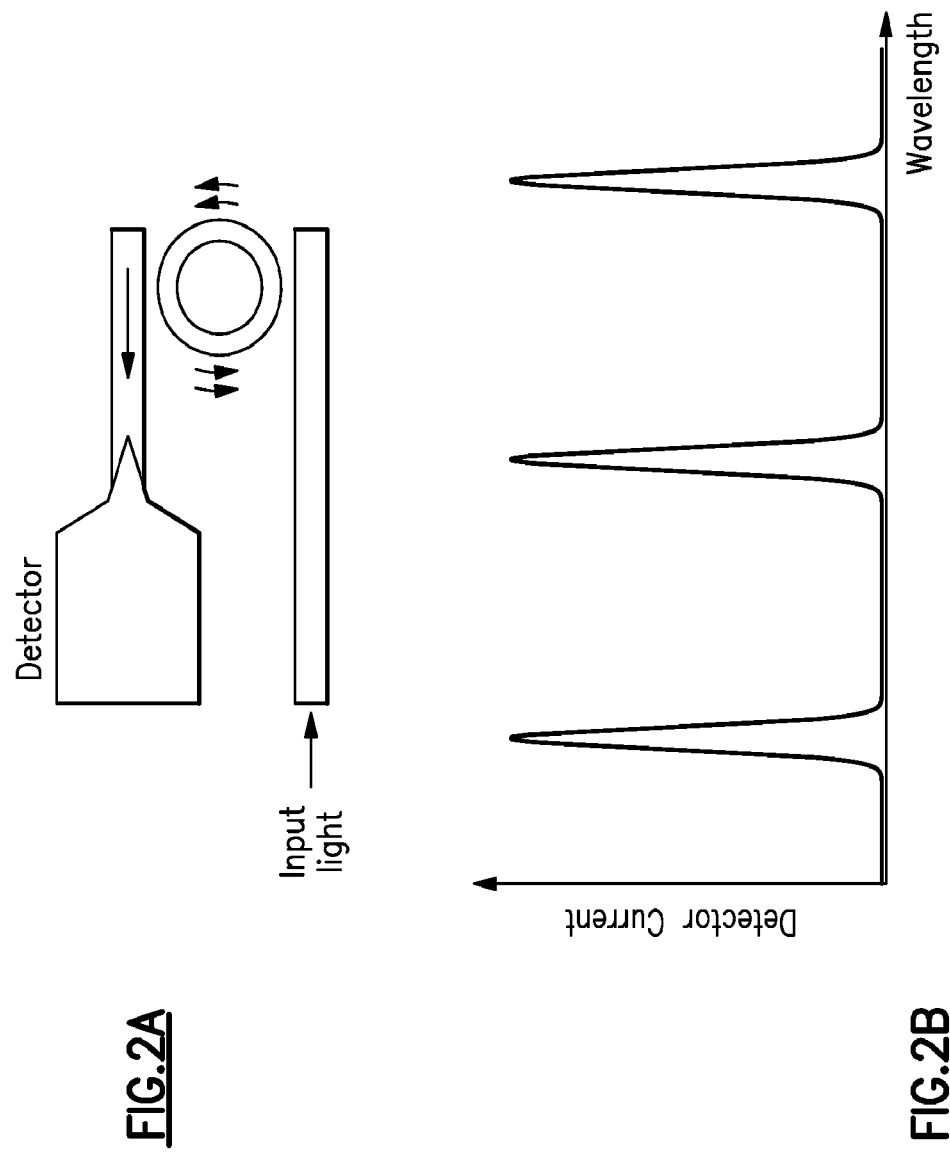
FIG. 2A is a drawing showing a schematic diagram of a single ring resonator coupled to bus waveguide drops light onto detector at wavelengths that match its resonance.
FIG. 2B is a drawing showing a graph which illustrates how a detector converts light dropped by a ring resonator into a current.

FIG. 2A is a drawing showing a schematic diagram of a single ring resonator coupled to bus waveguide drops light onto detector at wavelengths that match its resonance.

FIG. 2B is a drawing showing a graph which illustrates how a detector converts light dropped by ring resonator into a current, which is non-zero only for resonant wavelengths.

The spectrometer is based on many ring resonators. Each ring resonator is coupled to a bus waveguide that delivers the light to be sensed, and to a drop waveguide that sends the light that entered the ring onto a photodetector. Light incident on a single ring resonator will couple into the ring only when an integer number of waves fit in the ring. This leads to the well-known comb-like spectrum of a ring resonator. The ring resonator will therefore sample a "comb" of wavelengths of the incident light and send it to a detector.

Figure 3A:
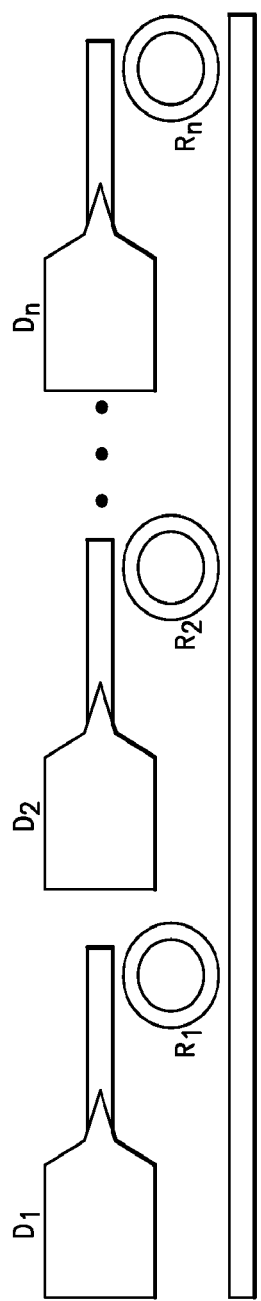
FIG. 3A is a drawing showing a schematic diagram of an array of ring resonators of different diameters and coupling conditions which samples the incoming spectrum and sends the light to on-chip detectors.

FIG. 3A is a drawing showing a schematic diagram of an array of ring resonators of different diameters and coupling conditions which samples the incoming spectrum and sends the light to on-chip detectors.

Figure 3B:
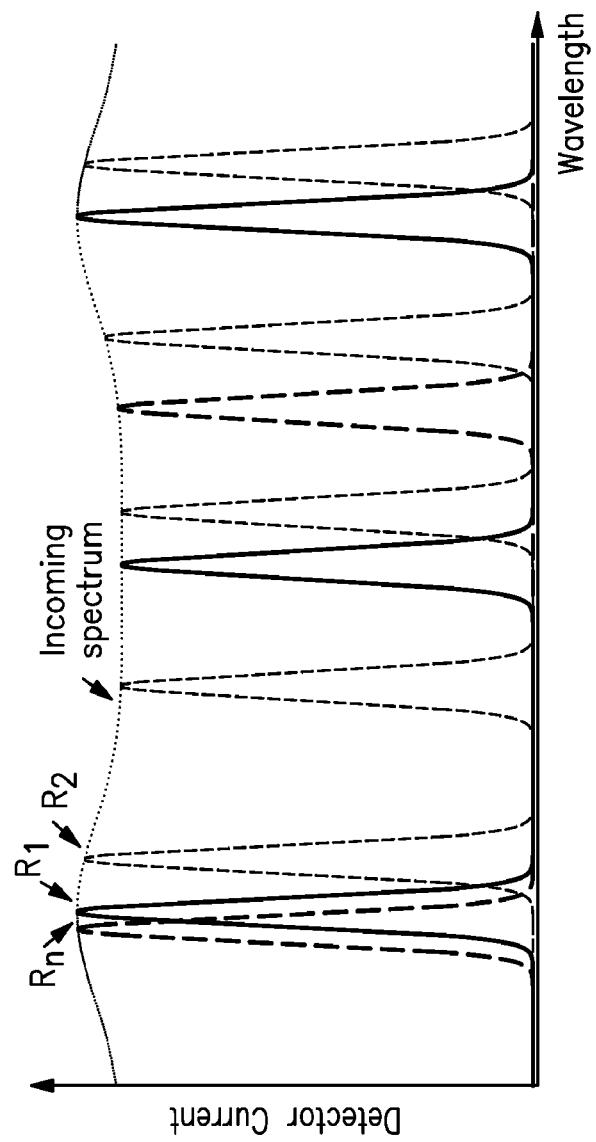
FIG. 3B is a drawing showing a graph of detector current at sampled wavelengths of the incoming spectrum.

FIG. 3B is a drawing showing a graph of detector current at sampled wavelengths of the incoming spectrum. Only three are shown for clarity. In the broad spectral range mode, the spectrum is decomposed into ring resonator modes and we will use the output of the detectors to reconstruct the full spectrum. In the "zoom" mode the ring resonator resonances will be tuned to sample the spectrum across one resonator spectral range at high resolution.

By providing an array of ring resonators that sample light at different wavelengths, we can recover the entire spectrum. However, the absolute resonance position of a ring resonator does not need to be well known because the full system uses the variability of ring resonators to our advantage.

The narrow spectral range, high resolution mode of the spectrometer operates by lining up the resonances of the ring resonators to sample the spectrum at the resolution of the resonance line-width. Ring resonators with quality factors in the 106 range are routinely made today. The quality factor will define the highest attainable resolution ($\Delta\lambda$) and the free spectral range of the rings will limit the spectral range of the spectrometer in its high resolution mode. The resonance wavelength of the ring resonators can be controlled by integrated microheaters directly above the ring resonator waveguide, but far enough that the heater doesn't contribute optical losses from absorption due to modal interaction with the heater metal.

FIG. 4 is a drawing showing exemplary integrated microheaters which enable resonance tuning by passing a current through a resistive element. The heaters are designed to be far enough away to not introduce optical losses, but as close as possible to minimize power consumption.

The free spectral range of the ring resonator is directly proportional to the optical path length of the ring. To ensure that only wavelengths within the free spectral range of the ring are detected a tunable filter or switch network can be used.

Principle of Operation—A PIC spectrometer according to the Application can operate by the principle of operation of decomposing the incoming spectrum of light into a linear combination of ring resonator modes. One can think of the light that resonates in a cavity as a mode of the system.

Because each ring resonator has at least one detector optically coupled to it, a PIC spectrometer according to the Application can differentiate to which rings and the corresponding portion light is coupling into each ring. However, to extract which wavelengths are coupled into each ring resonator, information from all of the ring resonators and the calibration matrix are both considered.

There should also be a partial wavelength overlap between the resonances of different ring resonators. Although the resolution and spectral range of the spectrometer is mainly determined by the compressed sensing algorithm, number of ring resonators and the sparsity of the input spectrum, the resolution and spectral range of the spectrometer can be optimized by controlling this overlap. The amount of overlap can also decrease the inner product of columns at different wavelength. However, too much overlap can decrease the signal to noise ratio (SNR) near a tail of a ring's spectral response. The distribution of the ring resonator diameters can be used to optimize resolution and spectral range of the spectrometer.

In summary, resolution and spectral range of a PIC spectrometer according to the Application is mainly determined by compressed sensing algorithm, number of ring resonators and sparsity of input spectrum. A partial wavelength overlap between resonances of different ring resonators also matters by affecting the SNR of rings near the tail.

A process algorithm can be used for deterministic spectrum retrieval from the information obtained from the integrated photodetectors. Each different spectra incident on the spectrometer will generate a different intensity and spatial pattern on our photodetectors. This intensity and spatial pattern will correspond to a specific input spectrum. The measured spectrum can be extracted by use of the deterministic spectrum retrieval process algorithm. Because the spectrometer decomposes the incident spectrum into a linear combination of ring modes, every different spectrum can produce a unique distribution across the rings.

Calibration Matrix

Any suitable wavelength tunable light source can be used to generate the calibration matrix. A suitable wavelength tunable light source or a wavelength selectable light source, includes, for example, a wavelength tunable laser, a supercontinuum source, or one or more LEDs (e.g. including a plurality of selectable different wavelength LEDs). Calibration can also be done in the time domain with a white light interferometer, such as, for example is done in Fourier-transform infrared spectroscopy (FTIR).

An exemplary process to create a calibration matrix includes the following steps:

Determine the spectrometer working wavelength and bandwidth.

Determine a Scanning interval a by the FWHM of the spectral correlation function.

Tune a tunable laser to a starting wavelength $\lambda_0$ with one unit of power. (The bandwidth of the laser should be smaller than $d\lambda$)

Record data from the detectors, which will form the first column of the calibration matrix.

Tune the laser to a wavelength of $\lambda_0+d\lambda$ with the same amount of power.

Record data from the detectors, which will form the next column of the calibration matrix Repeat the measurements of Tune the laser to a wavelength of $\lambda_0+d\lambda$ and Record data from the detectors to an end wavelength to complete the calibration matrix of n columns.

Alternatively, the calibration matrix can be generated with any suitable light source, such as, for example, a white light interferometer, a super continuum source, or even a sodium lamp.

Spectrum Reconstruction

An exemplary spectrum reconstruction process includes the following steps:

Solve the problem of $I_M = T_{M \times N} = x_N$, finding the solution x that is most similar to original input, where T is the calibration matrix, and I is the data from detector array.

Determine if the input spectrum is originally sparse or not, where sparsity is defined as a number of nonzero elements in the input vector.

If the input spectrum only has few discrete narrow band frequencies, finding the sparest solution by solving $\min\|x\|_1$, or If the input spectrum is broadband, convert x into a sparse vector tin wavelet domain x=Wt by use of a wavelet transform.

The question then becomes l=TWt=Nt, where the method of finding the sparest solution by solving $\min\|x\|_1$ can be used to solve t. Then, generate the reconstructed spectrum by x=Wt.

Specifying Ring Parameters for Fabrication

As described hereinabove, at the level of precision considered by a PIC spectrometer, individual ring parameters, especially ring resonant wavelength is "random" with respect to the initially specified pre-production ring sizes. The instrument exploits this randomness of the ring array, in part by the post production generated calibration matrix. However, it is still necessary to specify rings sizes and numbers for fabrication and/or manufacturing production.

Generally, ring sizes are specified to cover the desired spectral range of the PIC spectrometer. Other spectrometer parameters, such as resolution are related in part to the number of rings. In fact, experimental implementations have found that, considering the expected actual randomness of the post production ring arrays, generally more rings can ensure that a desired PIC spectrometer specification can be achieved. For example, more post production arrays for a particular specified PIC spectrometer might be usable following the calibration procedure for a 40 ring array as compared to a 20 ring array.

Example—Ring Parameter Selection for Fabrication/Production

To determine the number and the size of rings, we wrote a MATLAB code to simulate the whole process. Suppose we set the number of rings to be N and the rings are randomly selected from the range from a to b microns. Because our initial target bandwidth is 50 nm, the coupling will not change much within that range, so we fix the coupling at k. The detector detects drop port portion of the input power is determined by the equations in FIG. 10. The power remaining after being reduced by the drop portion, passes to the next rings. In this way, we can calculate the simulated calibration matrix by setting the input power to be 1. The simulated data that detector gets is the calibration matrix multiplied by the input spectrum. Next, we use the described algorithm to reconstruct the spectrum and compare the reconstructed spectrum with the original input spectrum. By monitoring the error between the two spectrums, we can modify and select the proper parameters for N, a, b and k.

The new broad spectral range photonic integrated circuit spectrometer with high resolution "zoom" is now described in more detail. The spectrometer of the Application includes an array of ring resonators coupled to the input spectrum and to drop photodetectors. The entire device can be integrated on a single chip. The diameter of the rings and optical coupling between the ring resonators and the input waveguide and photodetector is optimized.

The spectrometer can use a fully CMOS compatible photonic platform based on silicon nitride, silicon dioxide, silicon, and germanium. The devices can be fabricated at the using full silicon photonics multi project wafer runs, such as can be done, for example, by the Integrated Photonics—Institute for Manufacturing Innovation (AIM Photonics) of Albany, NY.

Prototypes can include test ring resonators of different widths, diameters, and coupling conditions. Such test structures can be used to characterize the photodetectors and a prototype spectrometer design. Silicon nitride can be used as the main guiding medium with silicon dioxide as the cladding. These two materials are transparent from the UV to the IR (~250 nm-4200 nm). The photodetectors can be silicon photodetectors for the visible range (400 nm to 1000 nm,) germanium for the NIR range from (1000 nm to 1600 nm), and InAsSb for the IR range (1600 nm to 4000 nm). The silicon and germanium photodetectors can be monolithically integrated during the device fabrication. InAsSb detectors can be added heterogeneously, such as, by bonding to the finished device chips. InAsSb detectors offer an advantage over HgCdTe in that they can operate at higher temperatures with near background limited detection. The IR detectors can be sourced commercially, such as, for example, in the form of a 2 to 3 inch diameter wafer with the needed epitaxial layers. Postprocessing implementation and testing can be done at a user nanofabrication facilities such as, for example, UR Nano at the University of Rochester and the Cornell Nanofabrication Facility at Cornell University to define and bond the detectors.

The AIM Photonics CMOS compatible platform can use materials compatible with the full spectral range of 400 nm to 4000 nm. For example, a standard offering of the AIM Photonics Full multiproject wafer (MPW) runs contains all the building blocks needed to fabricate the proposed spectrometer. The silicon layer can be nominally used for waveguides and modulators as our silicon detector layer. The nitride waveguide layer that AIM Photonics offers can serve as our main waveguiding layer for the spectrometer since silicon nitride is transparent over the full spectral range of interest. A germanium layer can be used for the NIR (1000 nm to 1600 nm) detectors.

Detector Integration onto Spectrometer PIC

IR detectors can be fabricated from commercially available integrated wafer scale InAsSb grown on GaSb wafers can be used to cover the IR band (1,600 nm to 4,000 nm).

CMOS compatible detector technologies, such as are available from AIM Photonics, can cover the spectral bands of the visible and NIR (400 nm to 1,600 nm). These exemplary detector technologies include silicon and germanium platforms. Silicon is a great detector for the visible wavelengths (400 nm to 1,000 nm) and germanium covers the NIR wavelengths (1,000 nm to 1,600 nm).

Figure 5B:
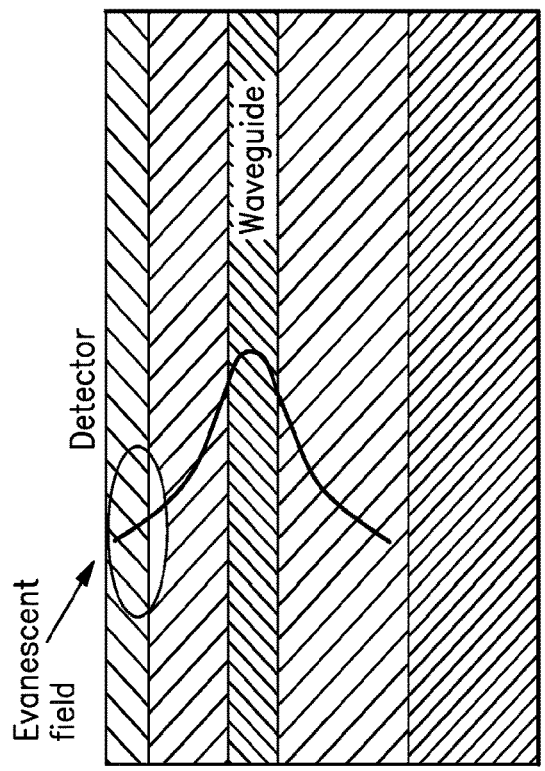
FIG. 5B is a drawing showing a cross section view of an exemplary side view of an optical field propagating along length of the waveguide and interacting with the detector via its evanescent field.
Figure 5A:
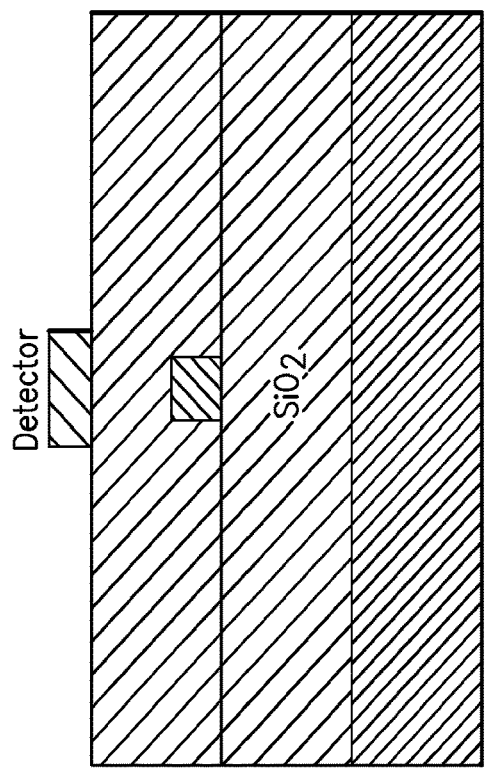
FIG. 5A is a drawing showing a cross section view of an exemplary detector sitting on top of an upper silicon dioxide cladding directly above a waveguide.

FIG. 5A is a drawing showing a cross section view of an exemplary detector sitting on top of upper silicon dioxide cladding directly above a waveguide. FIG. 5B is a drawing showing a cross section view of an exemplary side view of an optical field propagating along length of the waveguide and inter-acting with the detector via its evanescent field. The highlighted section shown inside the oval shows where the evanescent field overlaps the with detector and gets absorbed.

The optical coupling between the drop waveguide of the ring resonator and the integrated photodetector is configured to integrate the CMOS compatible photodetectors from the AIM platform onto the on-chip spectrometer. Coupling between the drop waveguides and the photodetectors is based on vertical evanescent coupling as shown in FIG. 5B. The waveguide mode is configured to enhance interaction of the waveguide with the detector layer via its evanescent field. Following absorption by the detector, the evanescent field is converted to an electrical signal. Reflections are minimized for negligible optical loss (e.g. FIG. 2A) by the geometry of the coupling region and detector tapering.

Using a heterogeneously integrated wafer scale, InAsSb detectors based on commercially available epitaxially grown wafers can be used to cover the IR band. A fabrication process can be used to pattern and bond an array of detectors at desired locations and address them optically and electrically on the chips, such as the prototype chips described hereinabove, which can be produced by AIM Photonics.

Figure 6C:
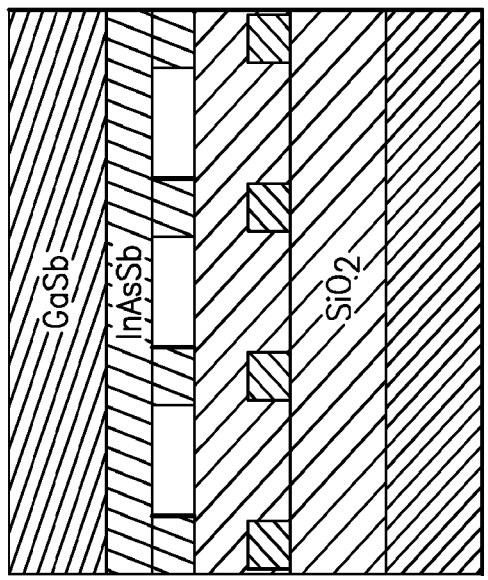
FIG. 6C is a drawing showing an exemplary flip and bond of the detectors onto a spectrometer chip.
Figure 6D:
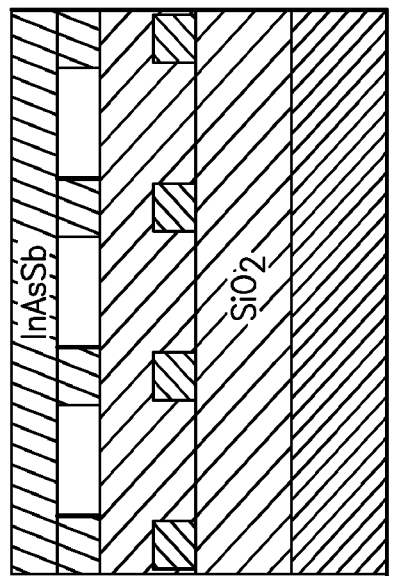
FIG. 6D is a drawing showing the removal of the GaSb substrate and contacts made to the detectors.
Figure 6A:
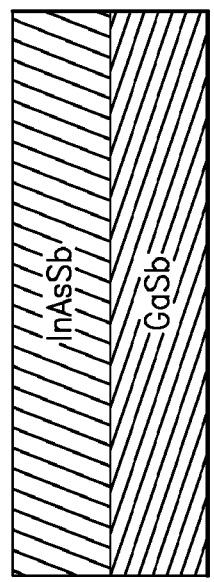
FIG. 6A is a drawing showing an exemplary commercially sourced wafer of InAsSb grown on GaSb.
Figure 6B:
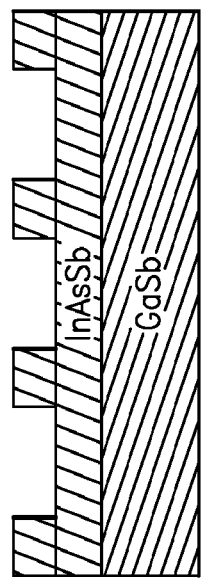
FIG. 6B is drawing showing a pattern and etch of the detectors using the wafer of FIG. 6A.

FIG. 6A to FIG. 6D are drawings showing an exemplary fabrication process for the IR detectors. FIG. 6A is a drawing showing an exemplary commercially sourced wafer of InAsSb grown on GaSb. FIG. 6B is drawing showing a pattern and etch of the detectors using the wafer of FIG. 6A. FIG. 6C is a drawing showing an exemplary flip and bond of the detectors onto a spectrometer chip. FIG. 6D is a drawing showing the removal of the GaSb substrate and contacts made to the detectors. To fabricate the detectors, wafers of InAsSb grown on GaSb can be patterned and etched with the detector pattern using chlorine plasma etching. Next, we can deposit metal contacts and thin down the GaSb substrate on which InAsSb detectors are grown, flip the wafer over and bond it on the spectrometer chip (FIG. 6A to FIG. 6D).

An exemplary spectrometer according to the Application includes a series of ring resonators with different radius coupled to one bus waveguide. Integrated detectors are placed on the drop port of each rings.

Figure 7:
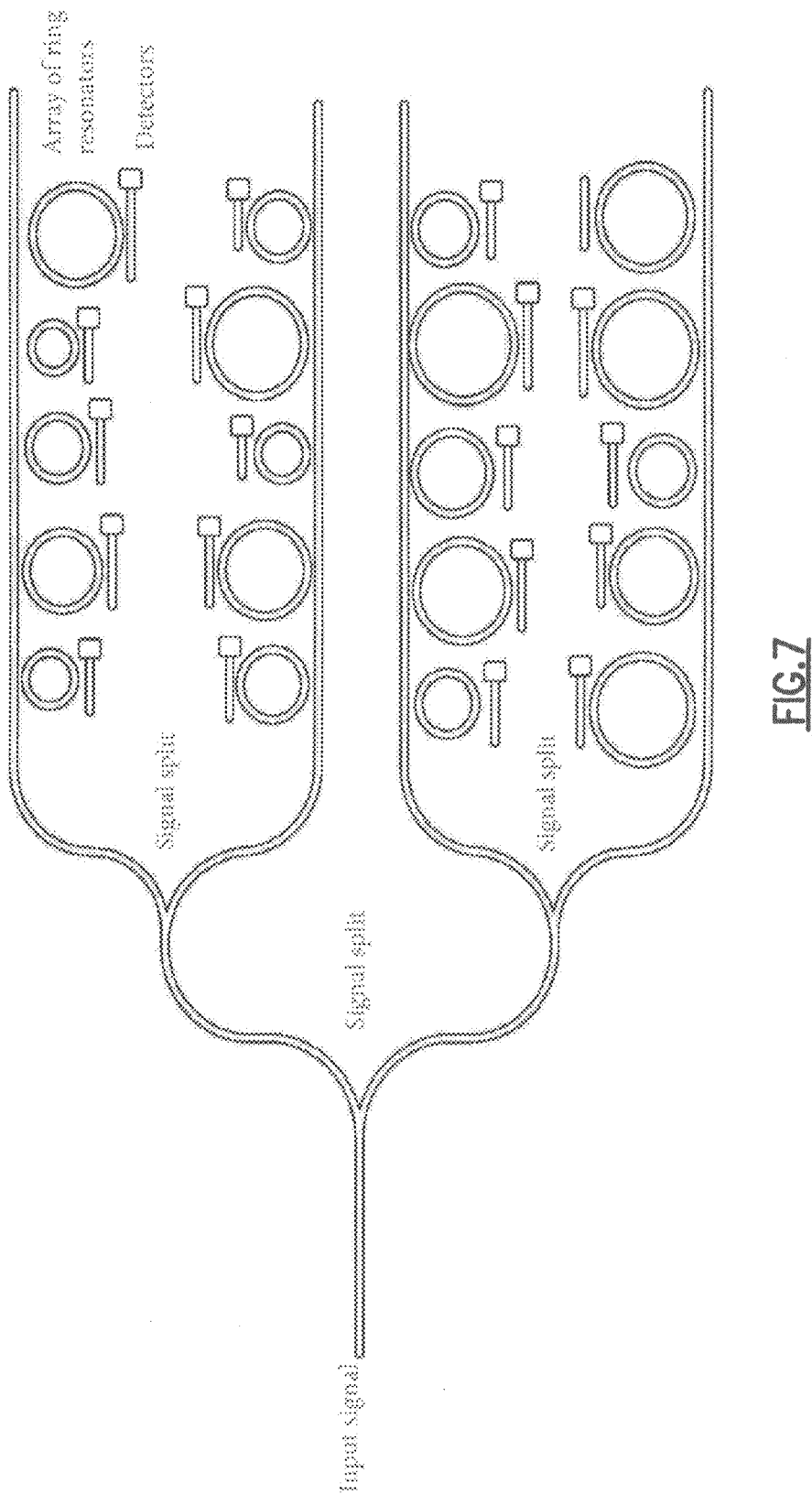
FIG. 7 is a drawing showing a schematic diagram of an exemplary random ring photonic integrated circuit spectrometer according to the Application.

FIG. 7 is a drawing showing a schematic diagram of an exemplary random ring photonic integrated circuit spectrometer according to the Application. The input signal is split into four paths, so that that rings at the end still receive a usable optical power.

Figure 8:
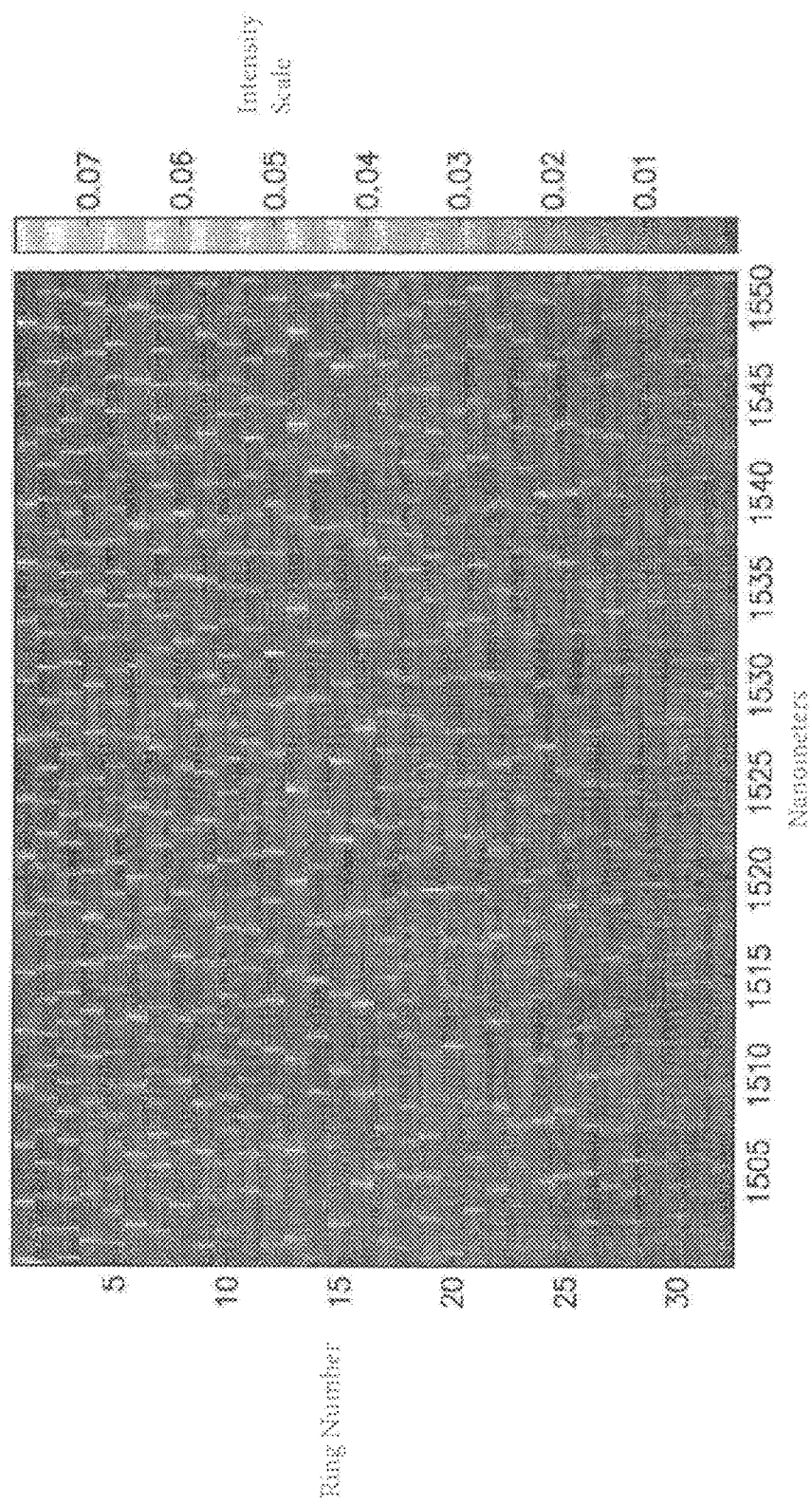
FIG. 8 is a drawing showing an exemplary calibration matrix.

The data collected by the detector array forms a wavelength depend column. By scanning the wavelength with a certain spectral channel interval $d\lambda$, a calibration matrix $T_{M \times N}$ is constituted. FIG. 8 is a drawing showing an exemplary calibration matrix, which is simulated with ideal add-drop ring resonator equations. The calibration matrix $T_{M \times N}$ can be obtained experimentally with a tunable laser, where the tunable laser linewidth are much smaller than $d\lambda$.

An important property of the spectrometer system is spectral correlation function $C(\Delta\lambda,x)=<I(\lambda,x)I(\lambda+\Delta\lambda,x)>_\lambda/<I(\lambda,x)>_\lambda I(\lambda+\Delta\lambda,x)>_\lambda-1>_x$, which can be used to select the spectral channel interval as well as predict the resolution of the spectrometer. The radius of each ring is uniquely and randomly selected in the range of 20 to 70 microns.

Figure 9:
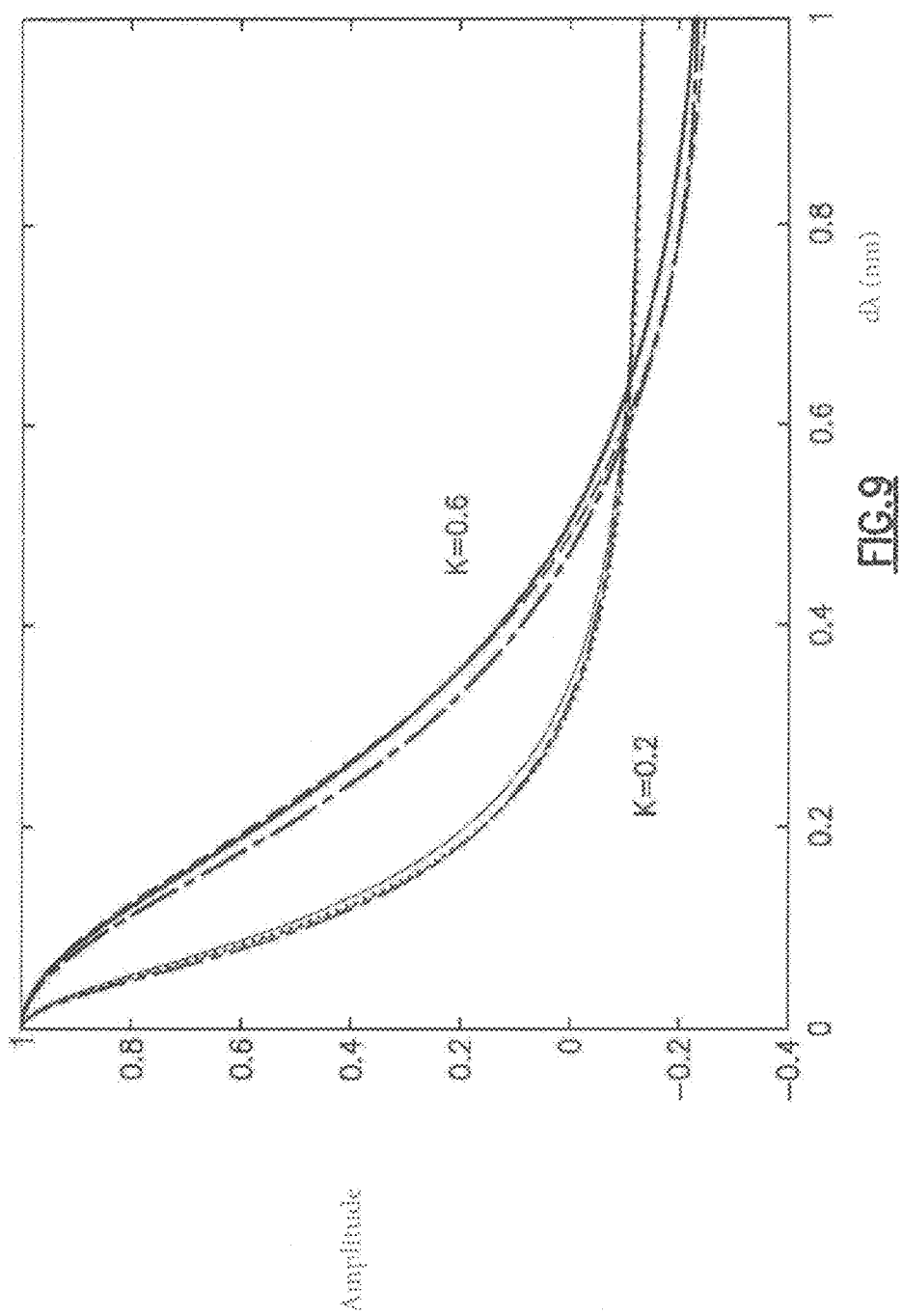
FIG. 9 is a graph showing an exemplary spectral correlation function.

FIG. 9 is a graph showing the spectral correlation function when setting the coupling between rings and bus waveguide to be 0.2 and 0.6. For an initial trial, we choose the coupling to be 0.6. From FIG. 9 we have the spectral correlation width $\delta\lambda=0.5$ nm. The spectral channel interval is set to be $d\lambda=\delta\lambda/5=0.1$ nm. The number of spectral channels was set to be 512. Thus, the bandwidth of the exemplary spectrometer is 0.1 nm*512=51.2 nm.

The output intensity at each detector can be written as $I(x,\lambda)=\int T(x,\lambda)S(\lambda)d\lambda$. After discretization, the output intensity can be re-written as $I_j=T_{ji}S_i$. For the detector array, it actually forms a matrix multiplication $I_M=T_{M \times N}S_N$, where I is the data vector collected at the detector array, T is the calibration matrix and S is the input spectrum. M is the number of rings and N is the number of spectral channels. To reconstruct the input spectrum, S can be solved for from I. Because M<<N, number of equations is far less than the number of unknowns, which is known as a n underdetermined matrix. Two methods can be used to solve it. The first method is to perform a pseudo-inversion $S=T^{-1}I$. However, this method is ill-conditioned. A little bit of noise will destroy the reconstruction. So, that solution can be used as an initial guess, and then put into an optimization process to minimize $\|I-TS\|_2$.

A more powerful method to solve the underdetermined problem is "compressed sensing". Compressed sensing aims to find the sparest one among the infinity number of solutions. In other words, we need to minimize $\|x\|_0$ subject to $Tx=I$. However, $l_0$ norm is almost impossible to solve in math, so $l_1$ norm can be minimized instead. The problem to solve then becomes minimize $\|x\|_1$ subject to $Tx=I$.

Figure 10:
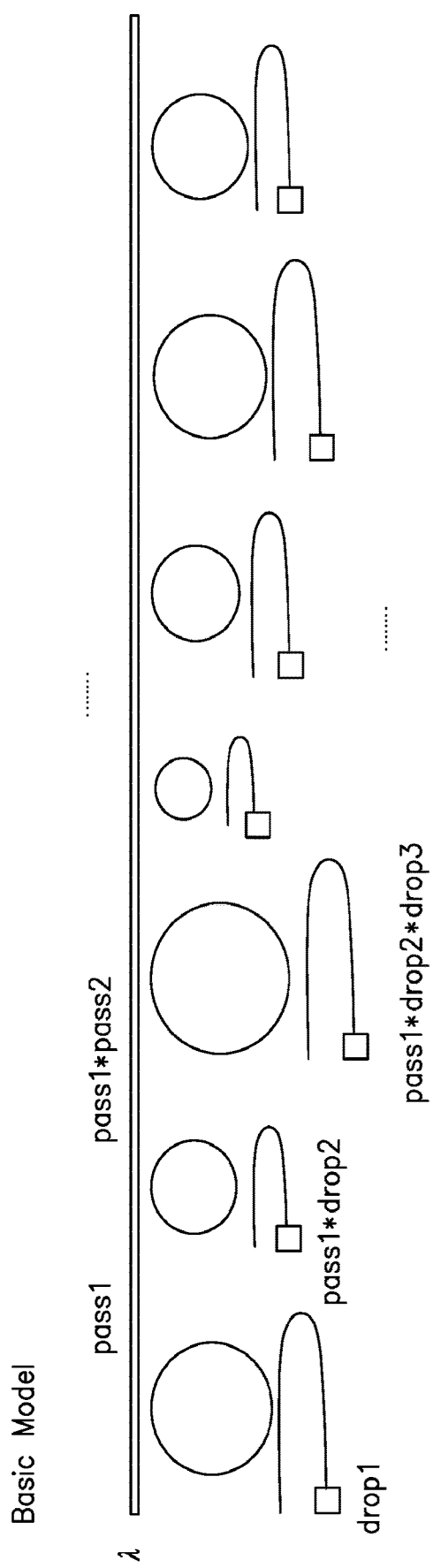
FIG. 10 is a drawing showing an exemplary basic model of a random ring photonic integrated circuit spectrometer according to the Application with a schematic diagram and associated exemplary modeling equations.

FIG. 10 is a drawing showing an exemplary basic model of a random ring photonic integrated circuit spectrometer according to the Application with a schematic diagram and associated exemplary modeling equations.

Figure 11:
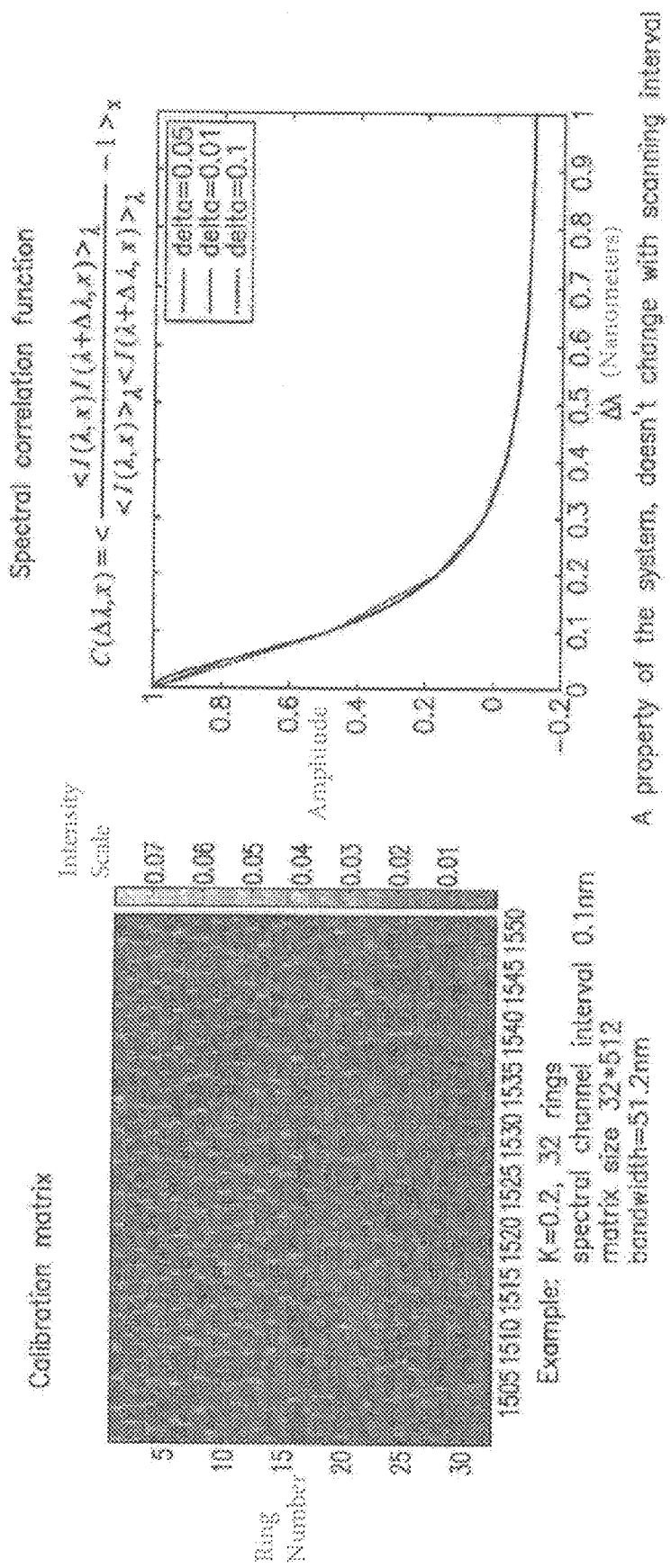
FIG. 11 is a drawing showing an exemplary calibration matrix and spectral correlation function.

FIG. 11 is a drawing showing an exemplary calibration matrix and spectral correlation function.

Figure 12:
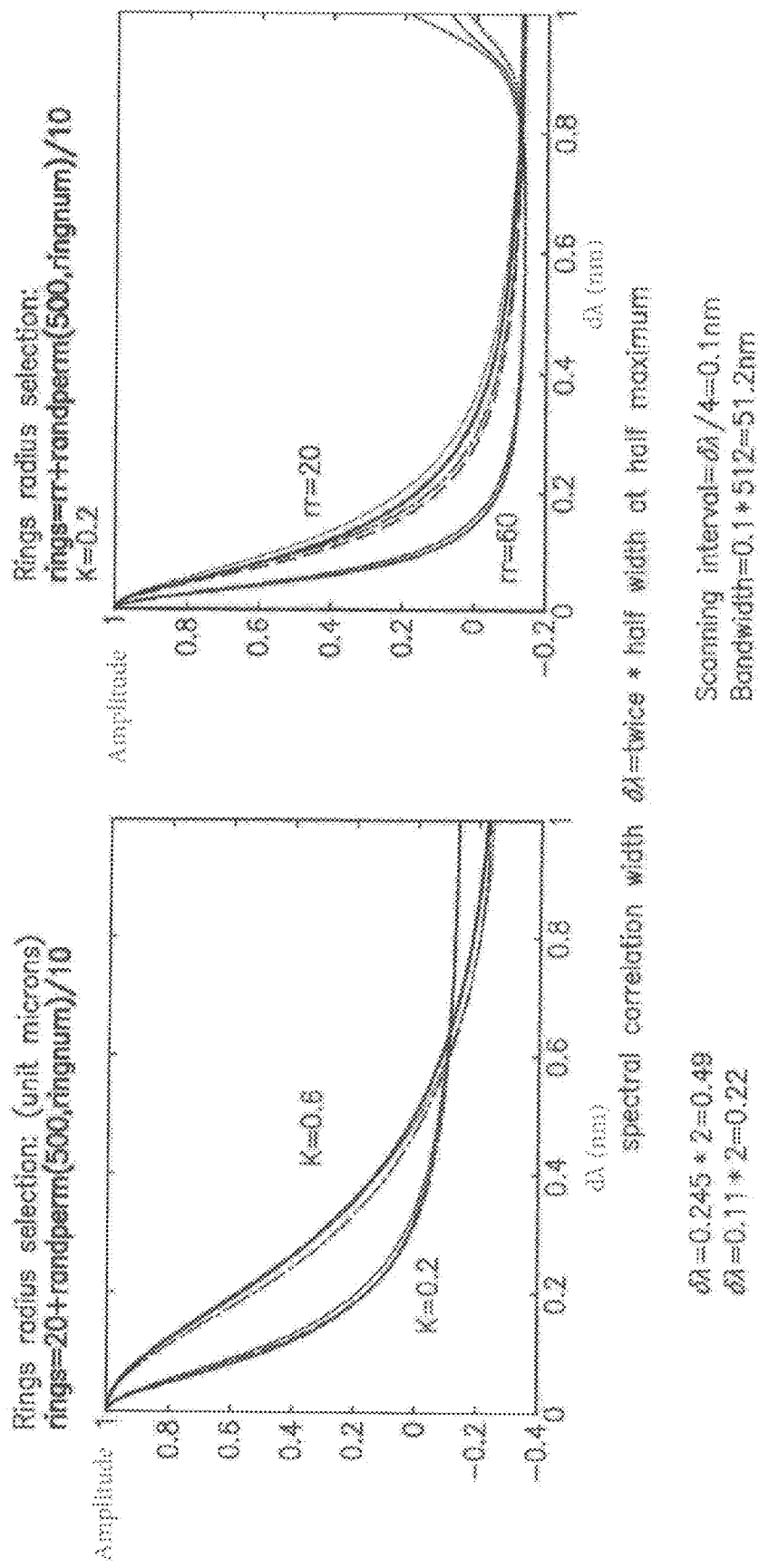
FIG. 12 is a drawing showing an exemplary spectral correlation function graphs.

FIG. 12 is a drawing showing an exemplary spectral correlation function graphs.

FIG. 13 is a drawing showing exemplary modeling of compressed sensing with exemplary code.

Figure 14:
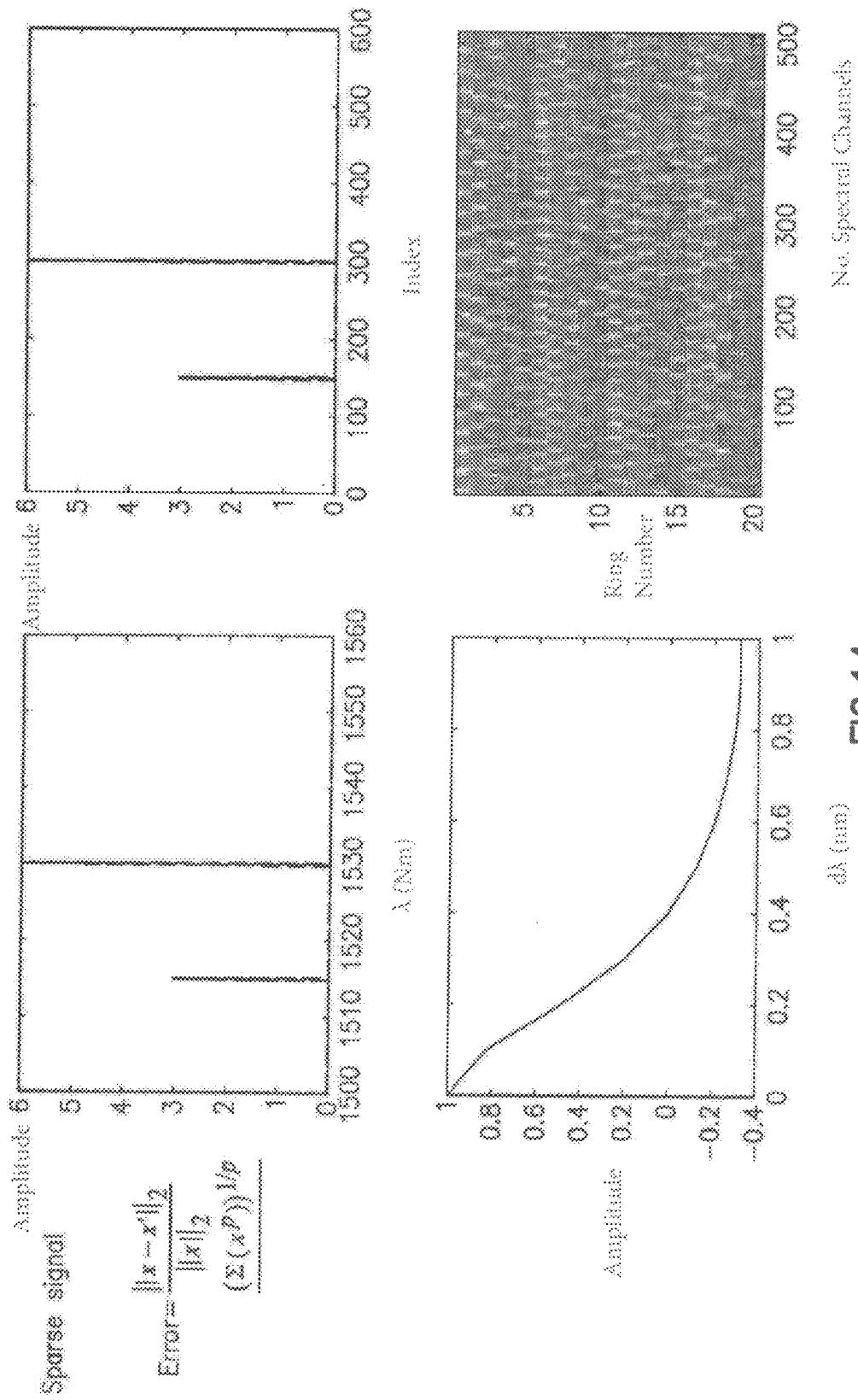
FIG. 14 is a drawing showing exemplary graphs for a sparse signal including spectra, spectral correlation, and a calibration matrix.

FIG. 14 is a drawing showing exemplary graphs for a sparse signal including spectra, spectral correlation, and a calibration matrix.

The number of rings can be changed to determine the condition for a stable reconstruction. The nature of compressed sensing requires that the input signal is sparse.

Figure 15:
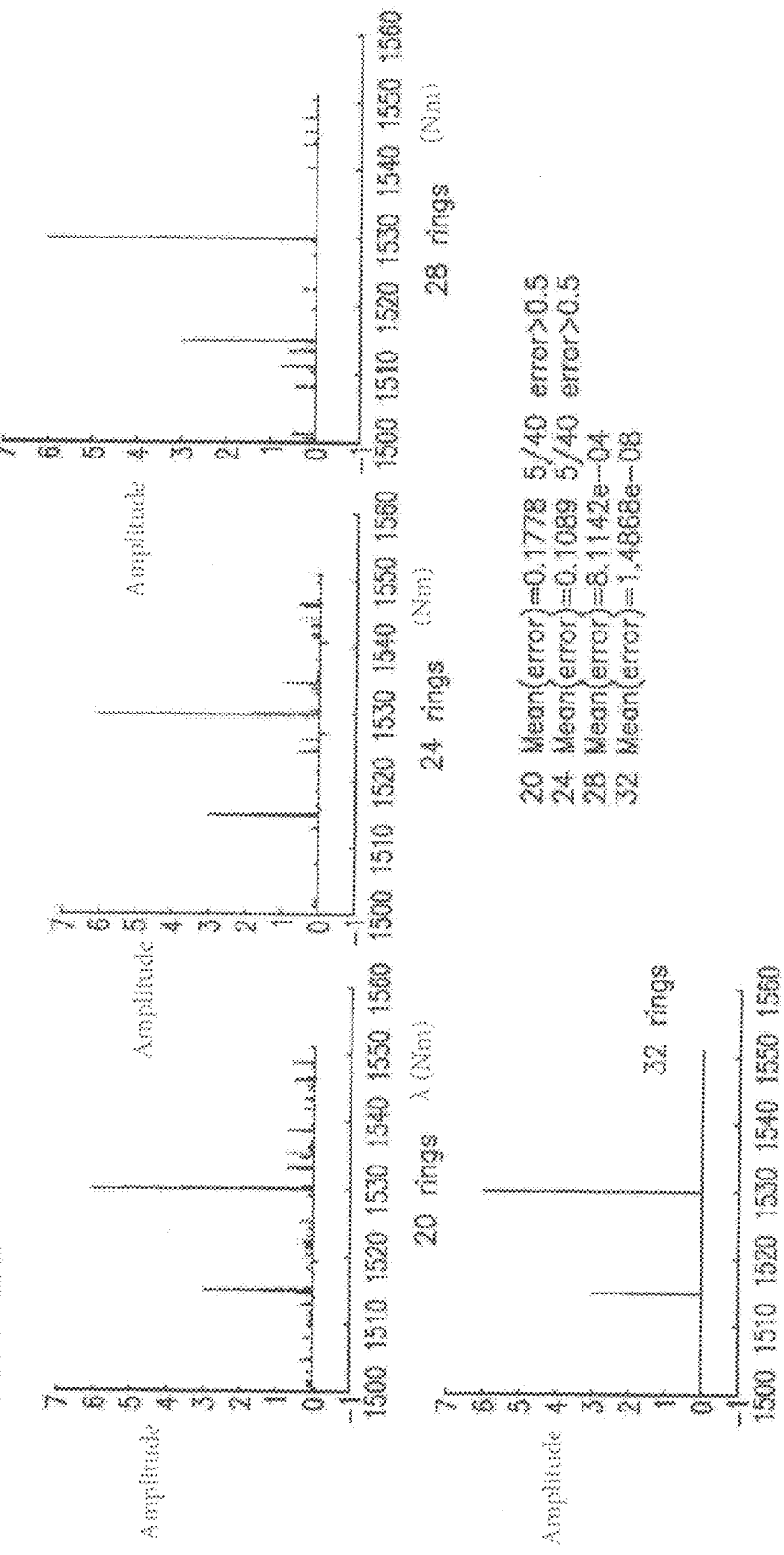
FIG. 15 is a drawing showing exemplary IR spectra having 2 discrete lines with 20, 24, and 32 rings without noise.

FIG. 15 is a drawing showing exemplary IR spectra having 2 discrete lines with 20, 24, and 32 rings without noise.

Figure 16:
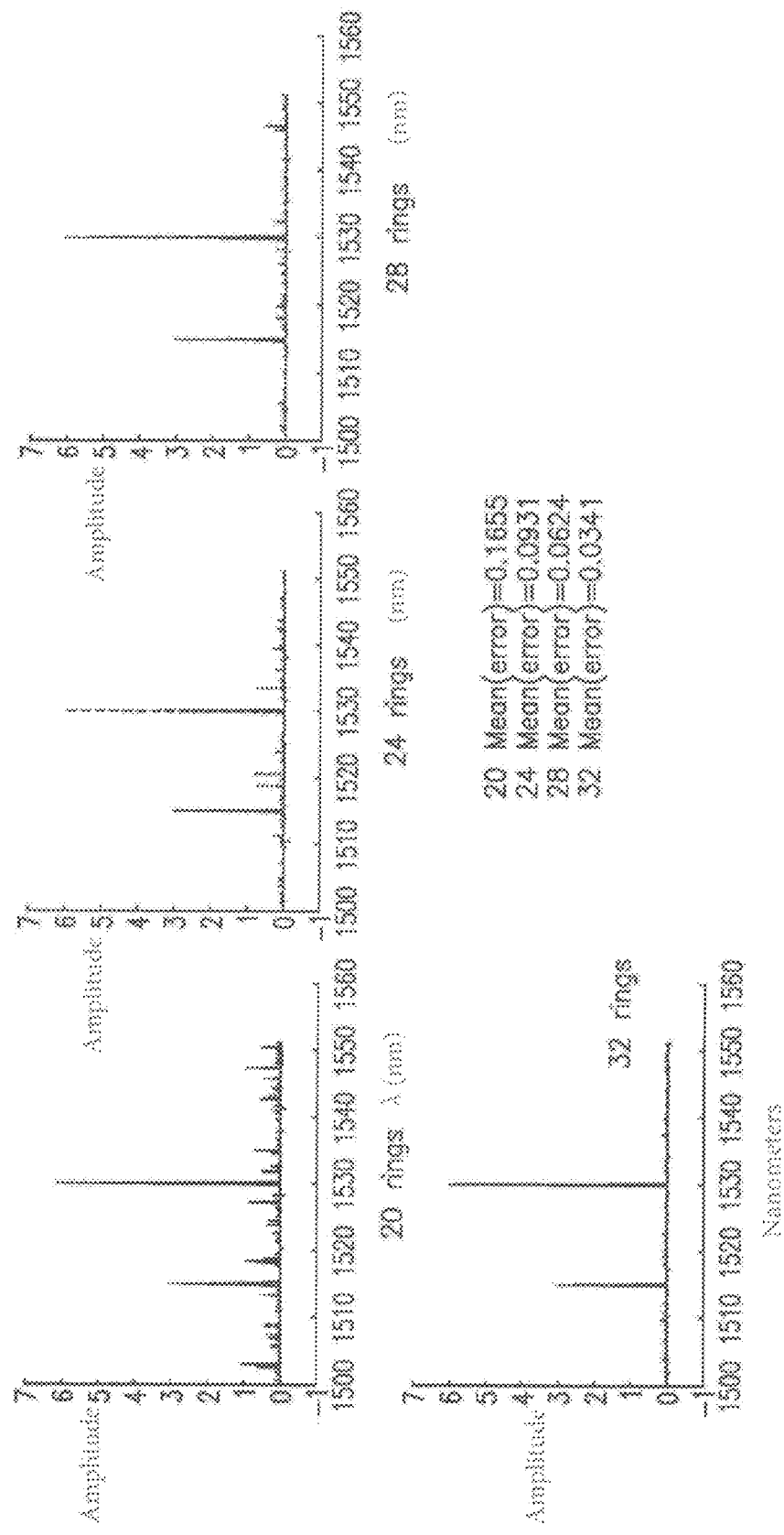
FIG. 16 is a drawing showing exemplary IR spectra having 2 discrete lines with 20, 24, and 32 rings with noise.

FIG. 16 is a drawing showing exemplary IR spectra having 2 discrete lines with 20, 24, and 32 rings with noise.

Figure 17:
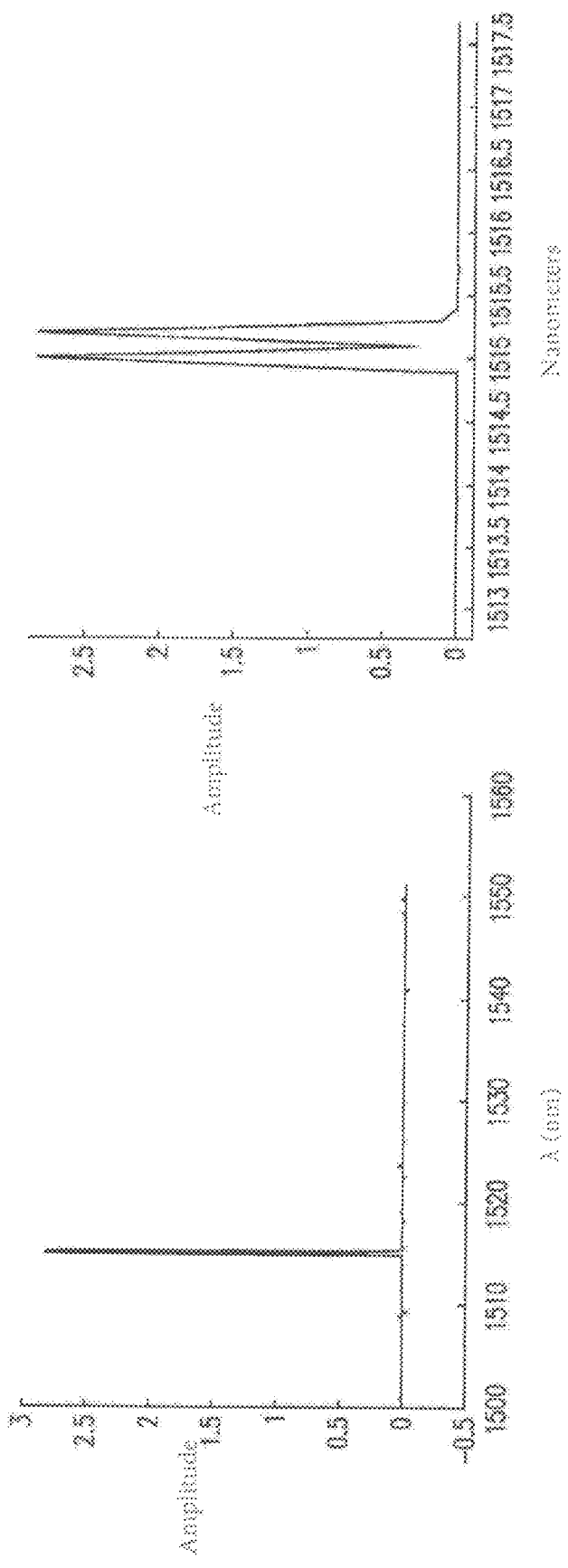
FIG. 17 is a drawing showing IR spectral resolution graphs.

FIG. 17 is a drawing showing IR spectral resolution graphs.

Figure 18:
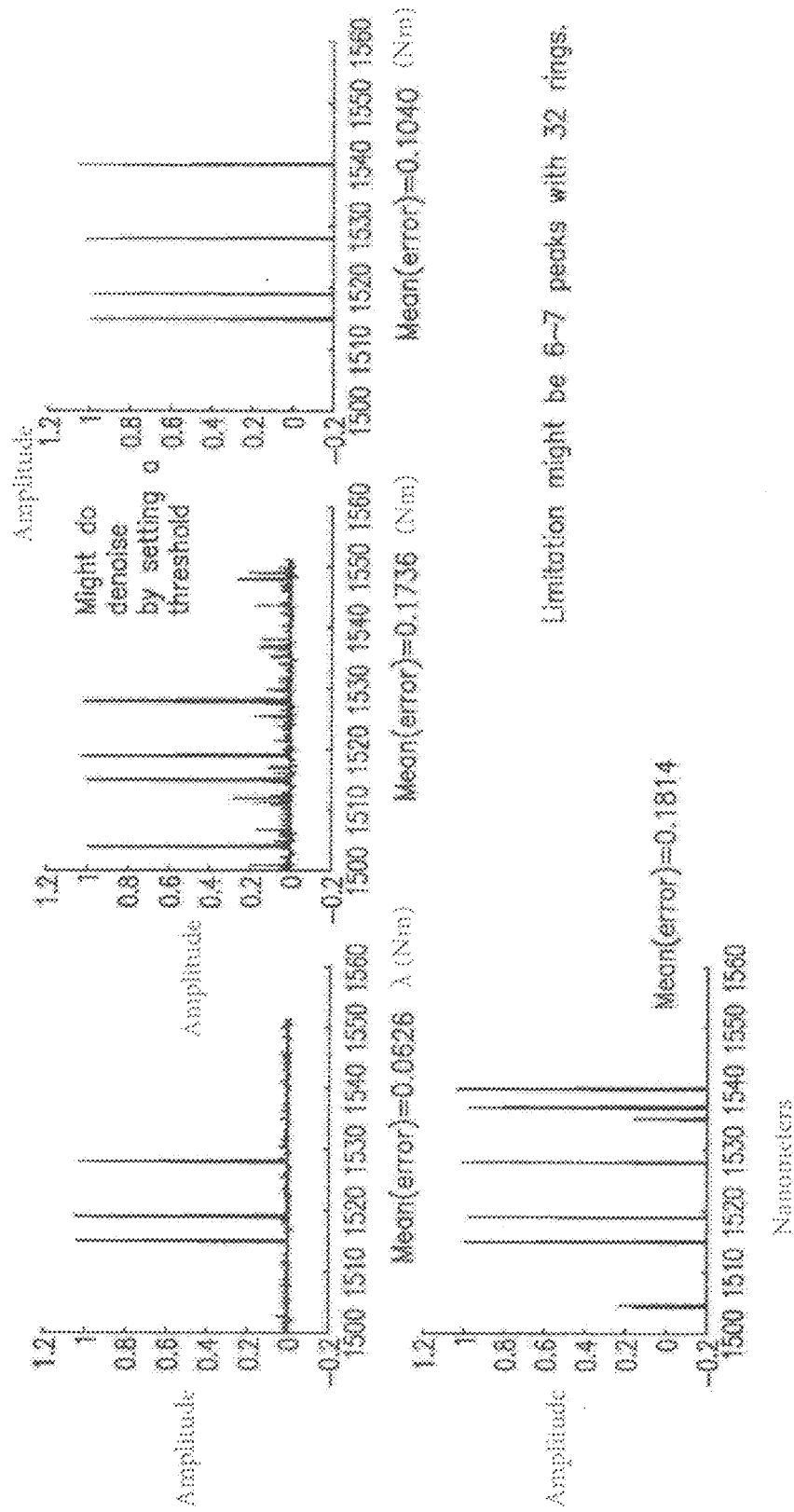
FIG. 18 is a drawing showing IR reconstructed peak graphs.

FIG. 18 is a drawing showing IR reconstructed peak graphs.

Example—The input spectrum was first set to have 2 discrete lines. The input spectrum was fixed and 40 different ring radius sets were used. The 40 reconstructed spectra are shown on one plot. We can see that the reconstruction possibility increases as we increase the number of rings. The reconstruction with 32 rings is still stable even with 1% of noise on detector. The number of discrete lines in the input spectrum were then increased. We can see that with 32 rings, reconstruction started to be unstable when there are 5 peaks. So, we can predict the limitation with 32 rings can be 6~7. This number can be increased as we increase the number of rings. When we set the input doublet to have a split of 0.2 nm, the 32 rings spectrometer can perfectly solve it.

For a broadband spectrum, the input signal is no longer spare. But it can be transformed to be a sparse signal under certain transformation, such as discrete cos transform (DCT) and wavelet transformation. The transformation can be written as $Ax=\theta$, where A is called a sparse operator and $\theta$ is sparse. So, the original matrix equation becomes $I=T \cdot A^{-1}\theta=B\theta$. By solving this function, we can get $\theta$ and then do an inverse transformation $x=A^{-1}\theta$ to obtain the reconstructed input.

Figure 19:
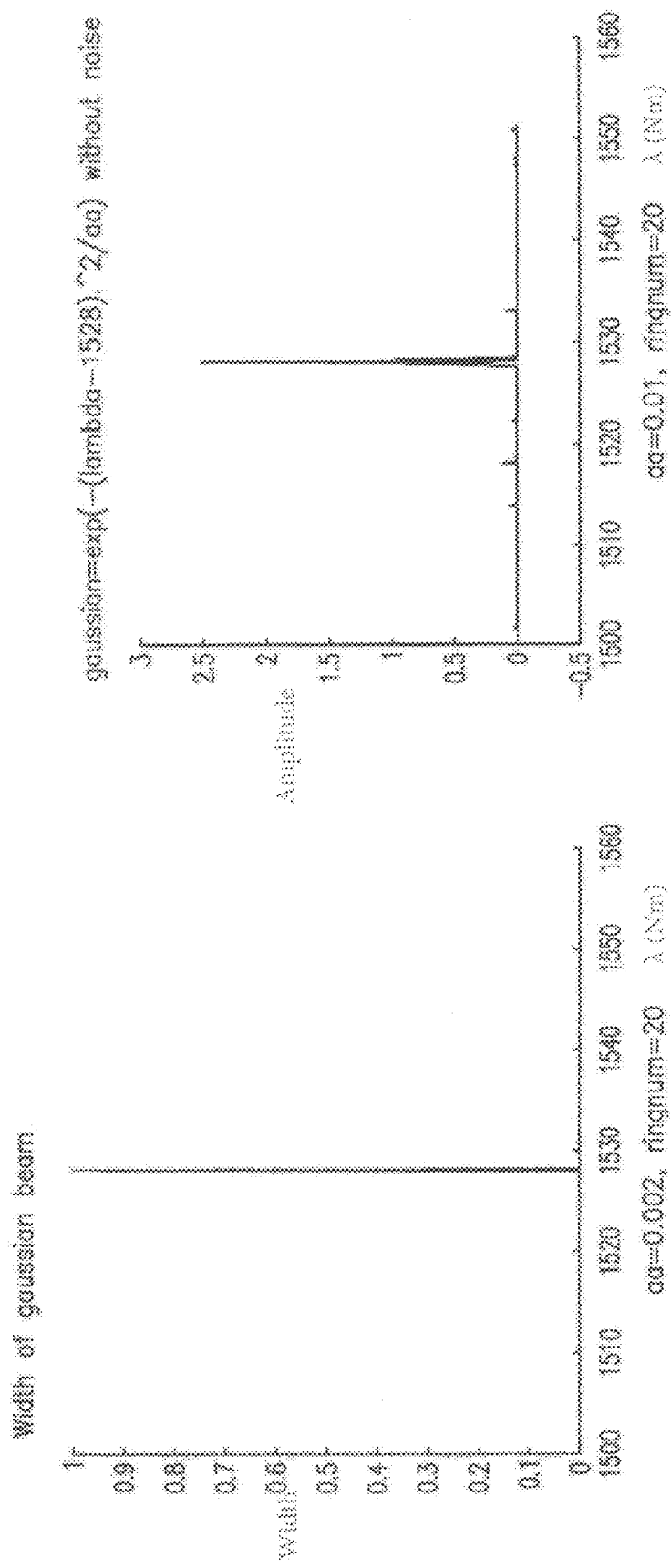
FIG. 19 is a drawing showing width of gaussian beam curves without noise for 20 rings.
Figure 20:
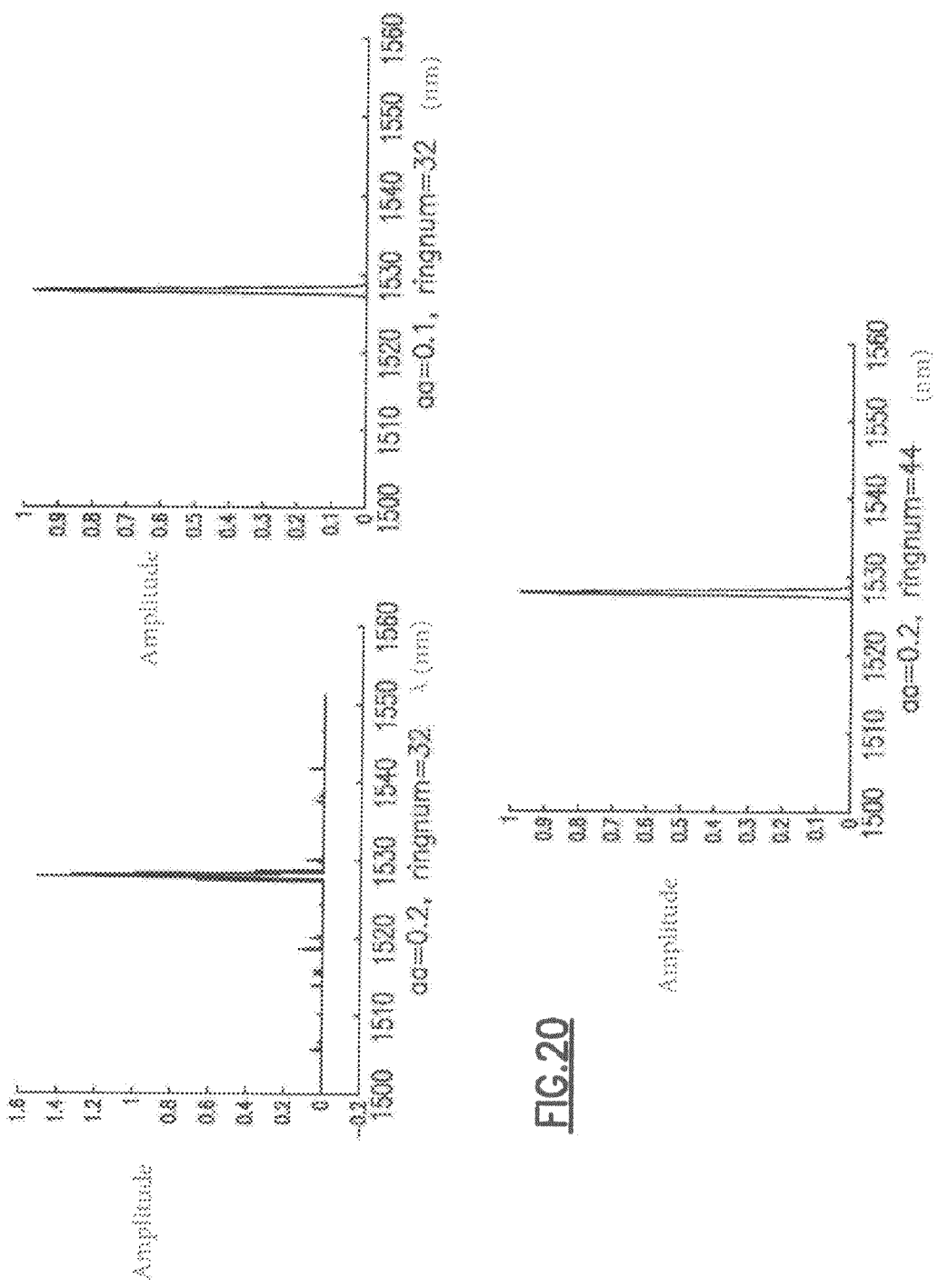
FIG. 20 is a drawing showing width of gaussian beam curves without noise for 32, and 44 rings.
Figure 21:
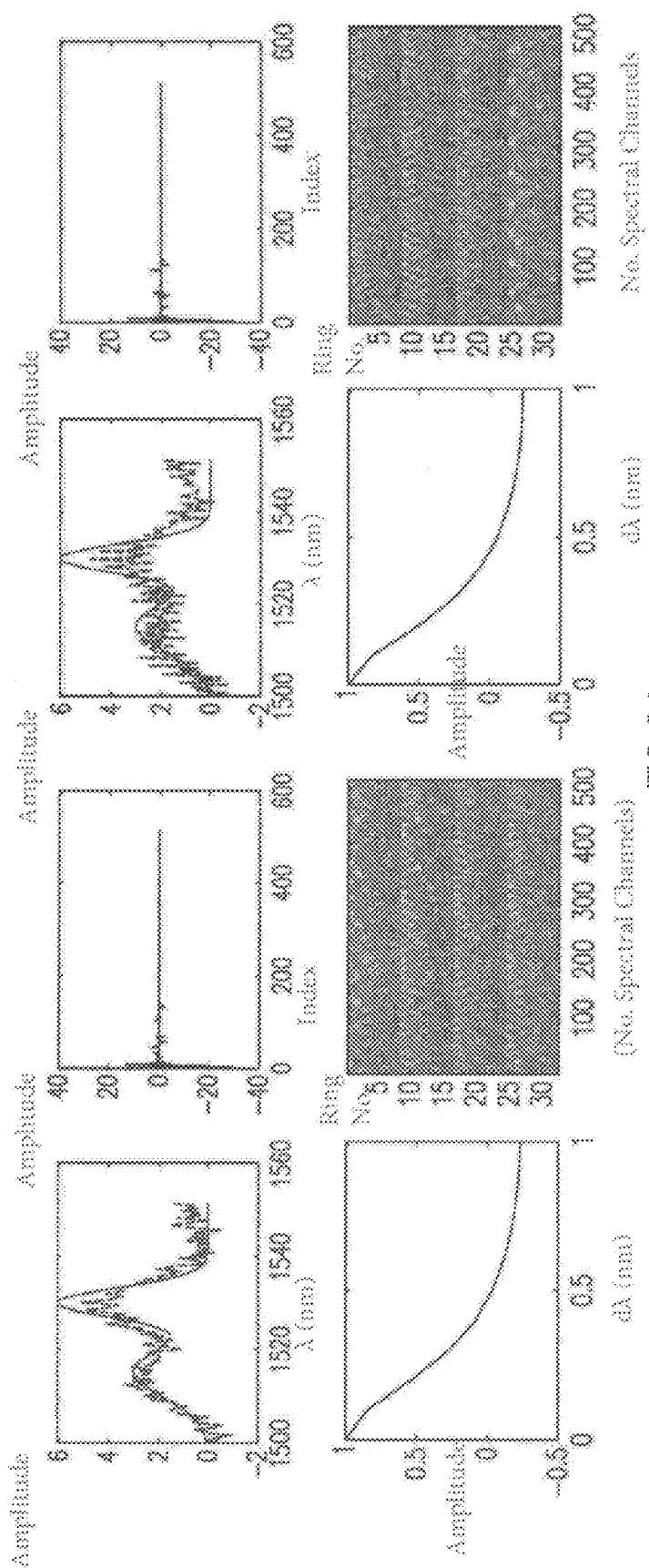
FIG. 21 is a drawing showing an exemplary broadband spectrum compressing operator with no noise, 32 rings, and corresponding spectral graphs, discrete cos transforms (DCT), spectral correlation graphs, and calibration matrix.

FIG. 19 is a drawing showing width of gaussian beam curves without noise for 20 rings;

FIG. 20 is a drawing showing width of gaussian beam curves without noise for 32, and 44 rings;

FIG. 21 is a drawing showing an exemplary broadband spectrum compressing operator with no noise, 32 rings, and corresponding spectral graphs, discrete cos transforms (DCT), spectral correlation graphs, and calibration matrix.

Figure 22:
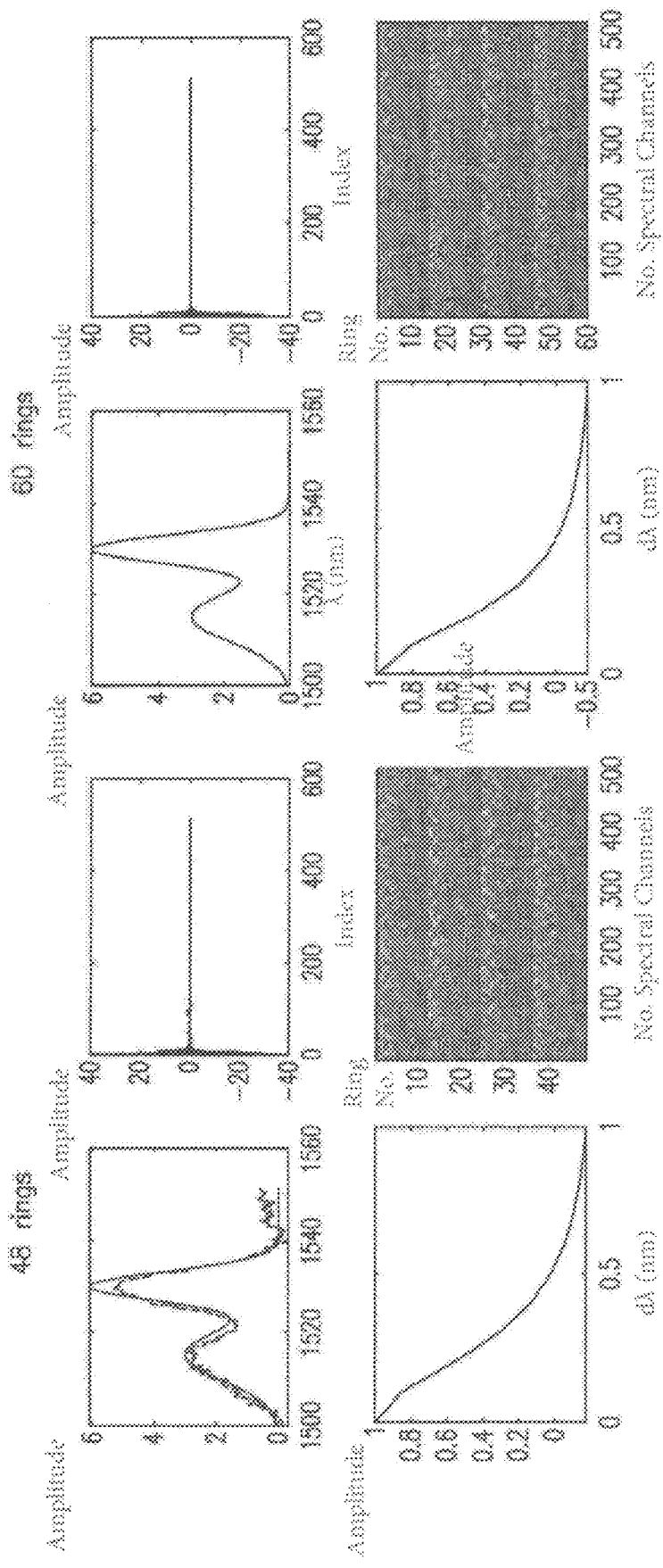
FIG. 22 is a drawing showing an exemplary broadband spectrum compressing operator with no noise, for 48 and 60 rings, and corresponding spectral graphs, DCT, spectral correlation graphs, and calibration matrix.

FIG. 22 is a drawing showing an exemplary broadband spectrum compressing operator with no noise, for 48 and 60 rings, and corresponding spectral graphs, discrete cos transforms (DCT), spectral correlation graphs, and calibration matrix.

Figure 23:
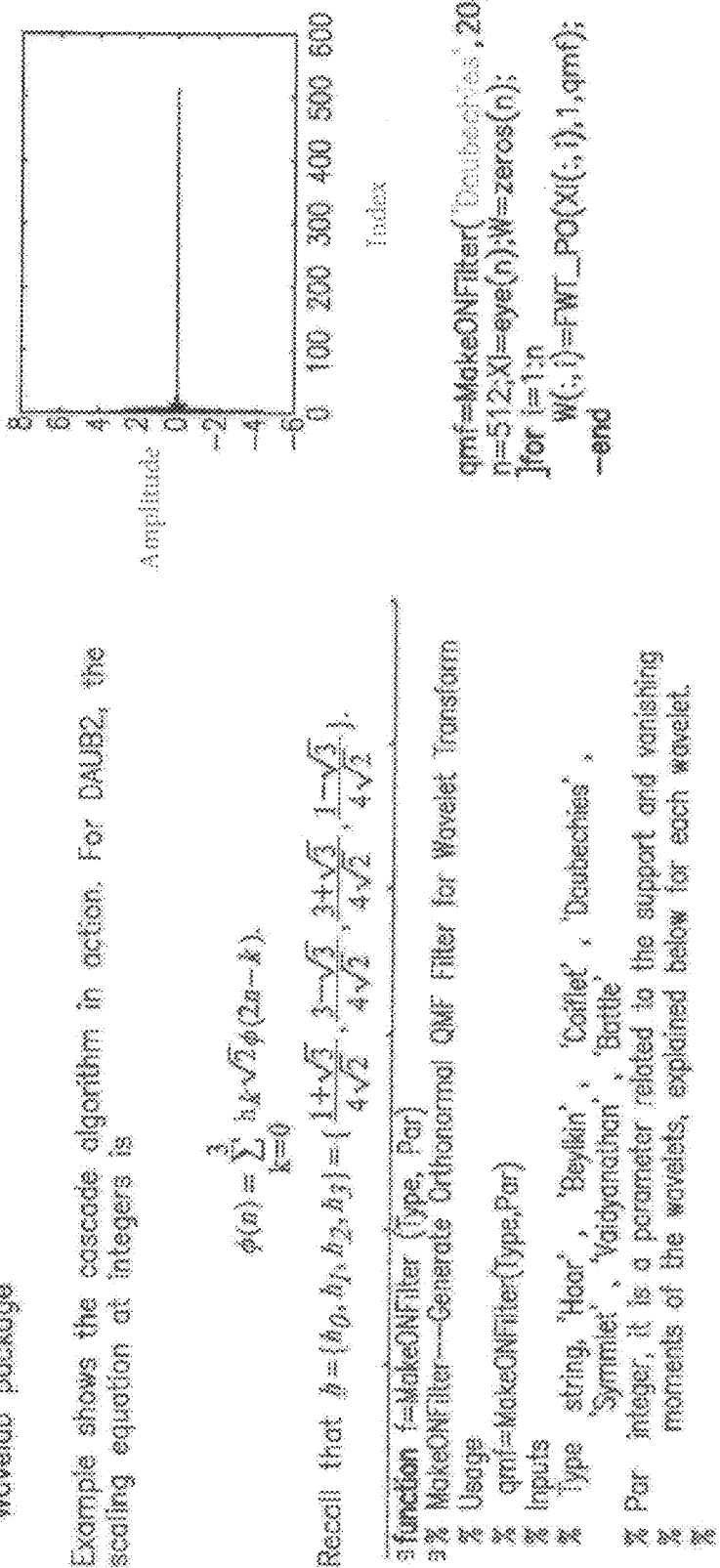
FIG. 23 is a drawing showing exemplary broadband spectrum equations and code using a compressing operator of a wavelet transform, performed using the Wavelab package of MATLAB functions.

FIG. 23 is a drawing showing exemplary broadband spectrum equations and code using a compressing operator of a wavelet transform, performed using the Wavelab package of MATLAB functions.

Figure 24:
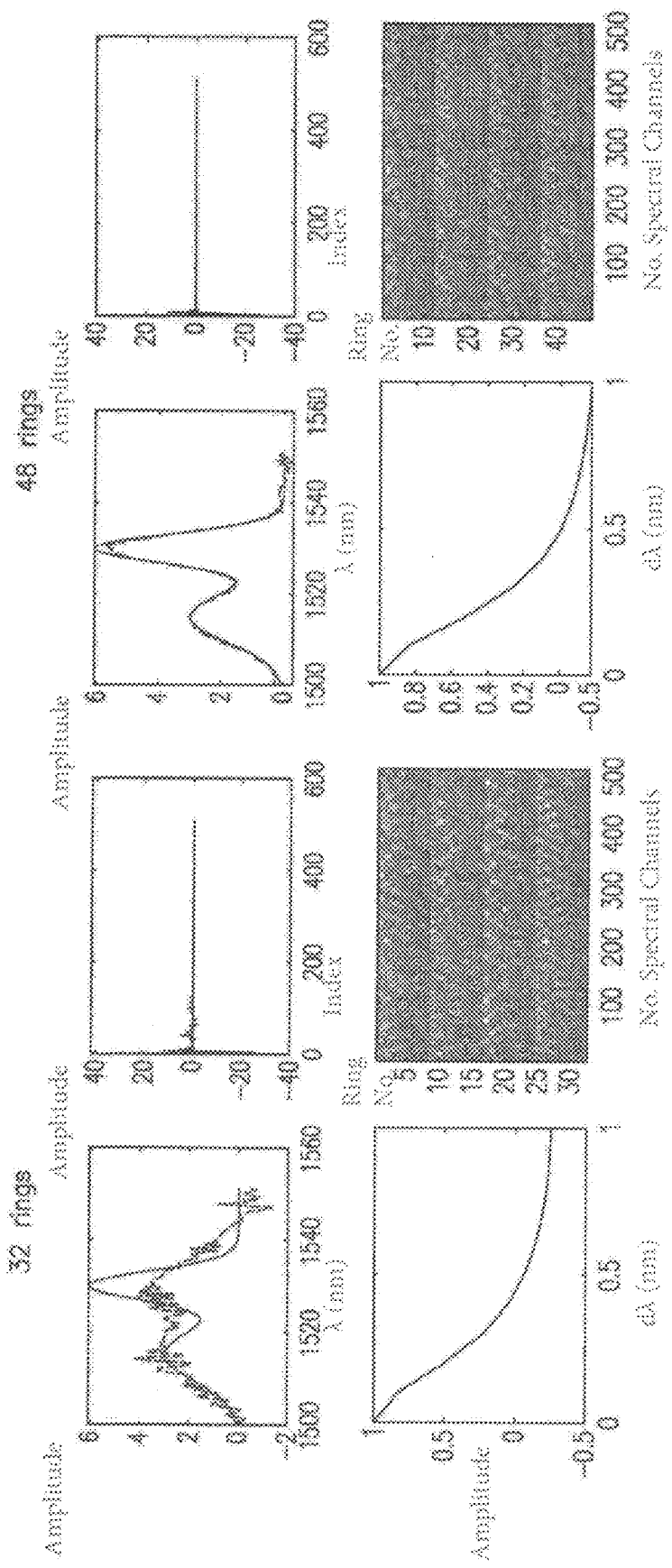
FIG. 24 is another drawing showing an exemplary broadband spectrum with no noise, 32 and 48 rings, and corresponding spectral graphs, DCT, spectral correlation graphs, and calibration matrix.

FIG. 24 is another drawing showing an exemplary broadband spectrum with no noise, 32 and 48 rings, and corresponding spectral graphs, discrete cos transforms (DCT), spectral correlation graphs, and calibration matrix.

Figure 25:
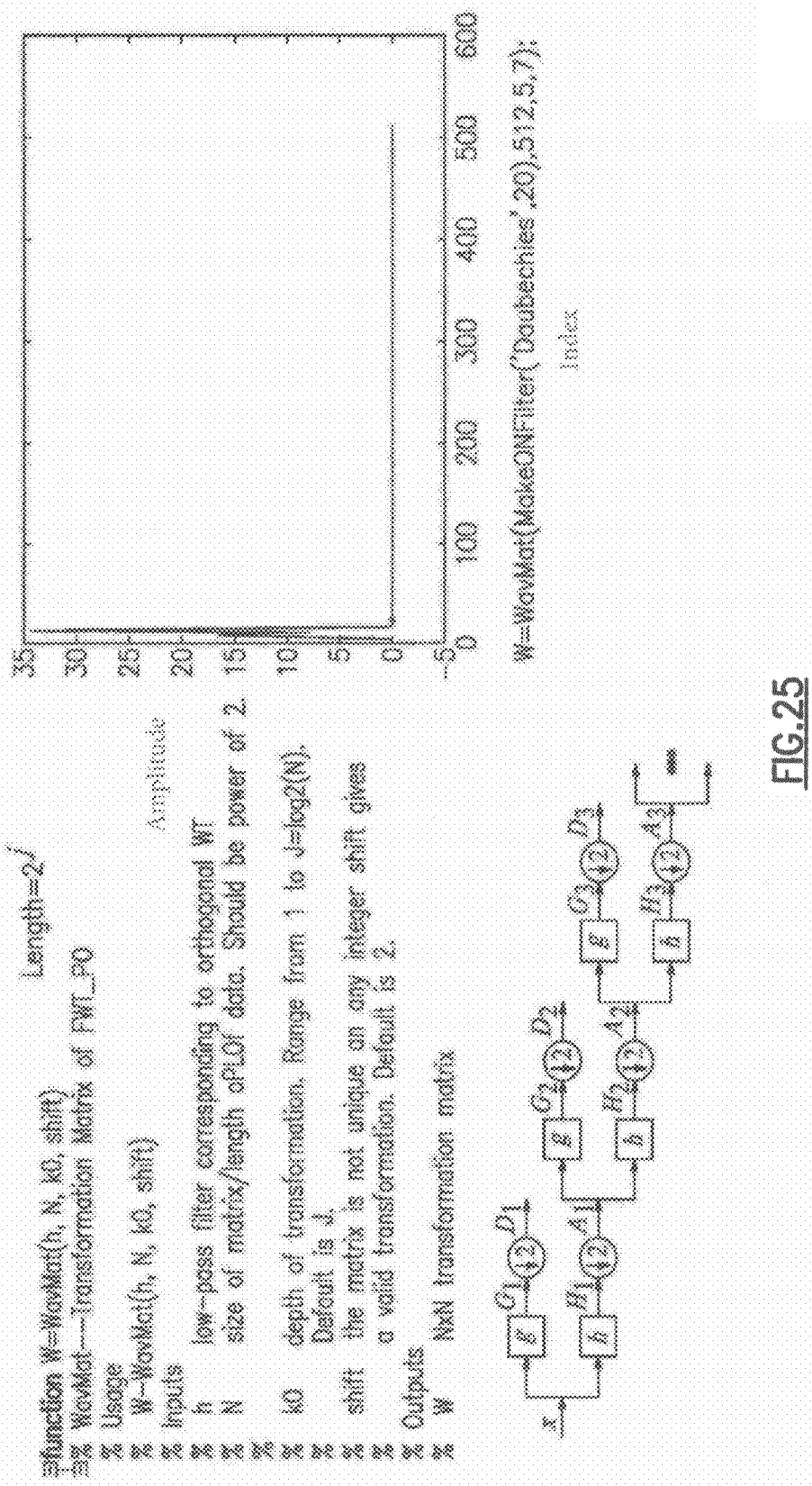
FIG. 25 is a drawing showing an exemplary WavMat transformation matrix.

FIG. 25 is a drawing showing an exemplary WavMat transformation matrix.

Figure 26:
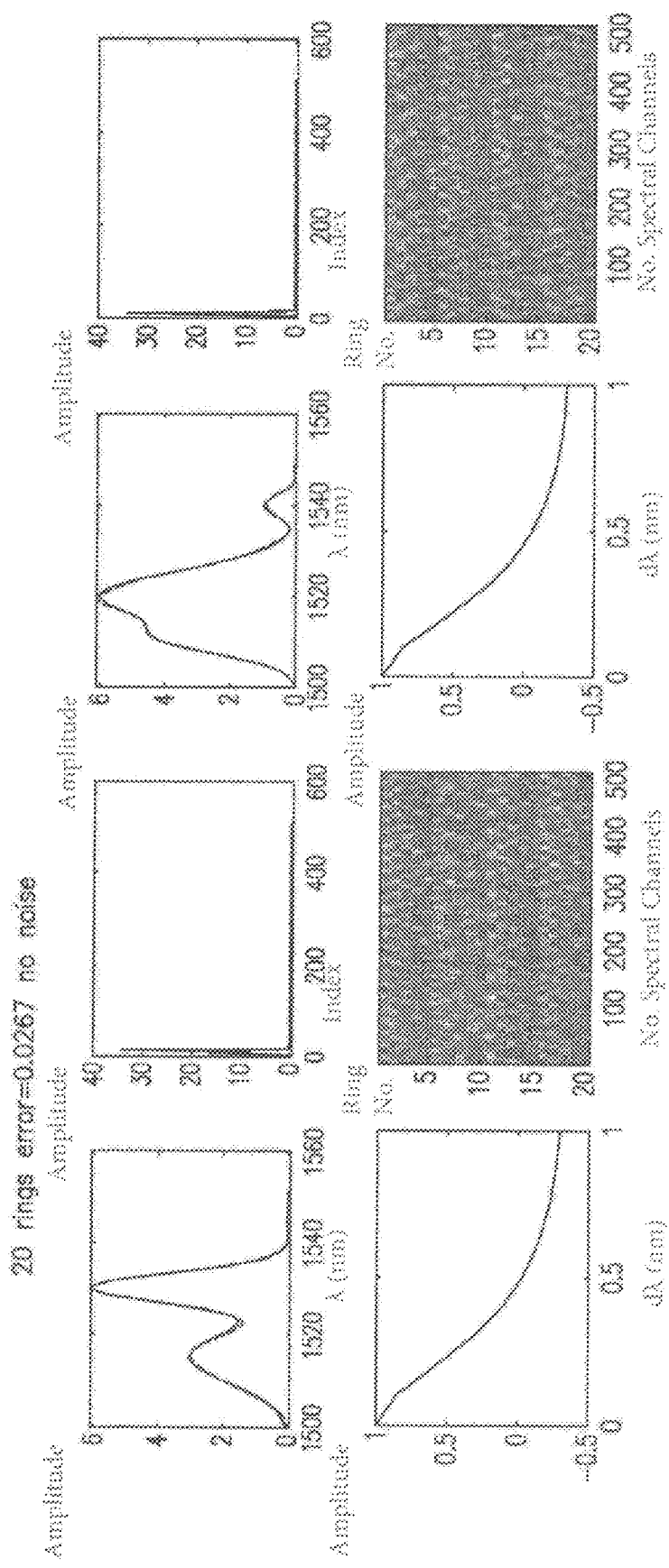
FIG. 26 is another drawing showing an exemplary broadband spectrum with no noise, 20 rings, no noise, and corresponding spectral graphs, DCT, spectral correlation graphs, and calibration matrix.

FIG. 26 is another drawing showing an exemplary broadband spectrum with no noise, 20 rings, no noise, and corresponding spectral graphs, discrete cos transforms (DCT), spectral correlation graphs, and calibration matrix.

Figure 27:
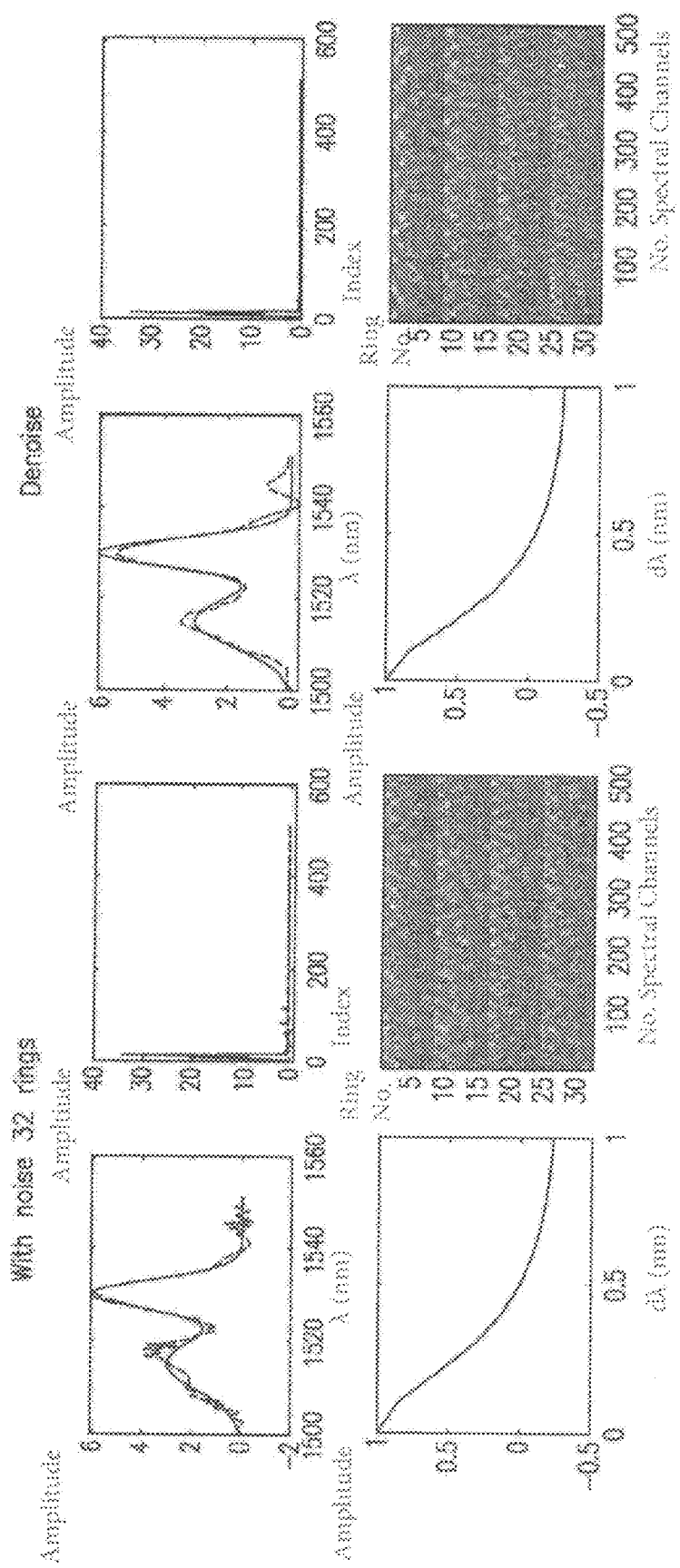
FIG. 27 is another drawing showing an exemplary broadband spectrum with no noise, 32 rings, with noise, and corresponding spectral graphs, DCT, spectral correlation graphs, and calibration matrix.

FIG. 27 is another drawing showing an exemplary broadband spectrum with no noise, 32 rings, with noise, and corresponding spectral graphs, discrete cos transforms (DCT), spectral correlation graphs, and calibration matrix.

Figure 28:
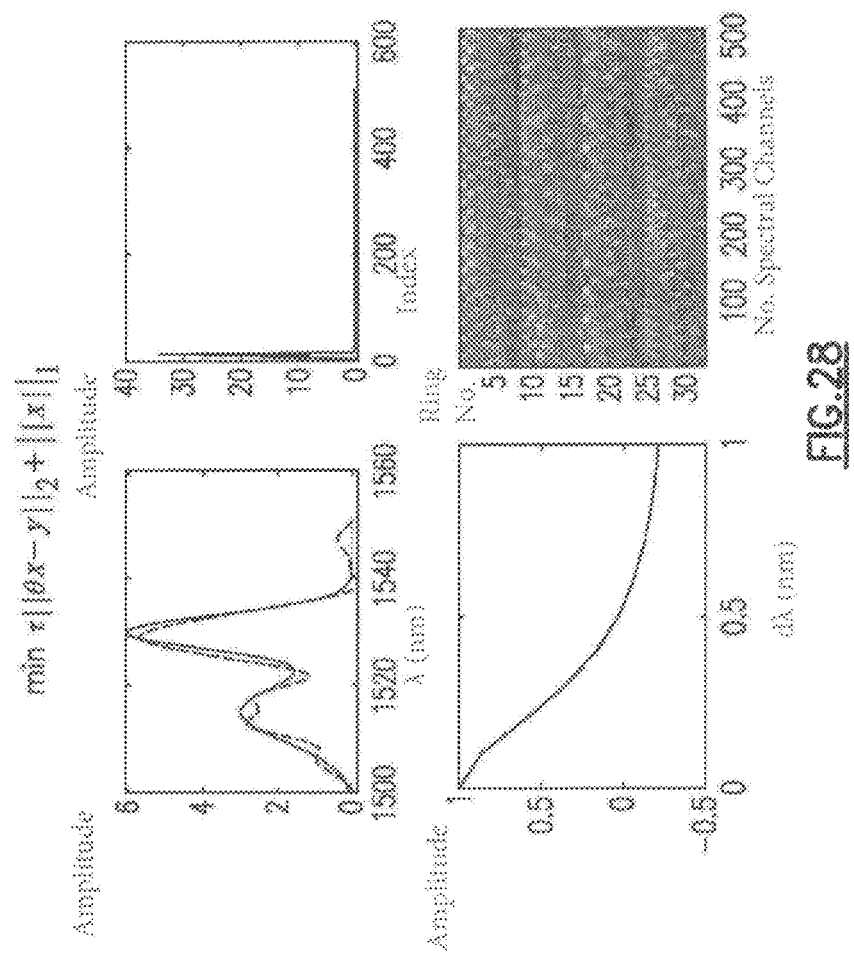
FIG. 28 is another drawing showing an exemplary broadband spectrum with corresponding spectral graphs, DCT, spectral correlation graphs, and calibration matrix.

FIG. 28 is another drawing showing an exemplary broadband spectrum with corresponding spectral graphs, discrete cos transforms (DCT), spectral correlation graphs, and calibration matrix.

Example—We select wavelet basis as the sparse operator, the transformation matrix is based on the algorithm described in book Statistical Modeling by Wavelets. Among all the wavelet families, we choose Daubechies20 and set the decomposition depth to be 5. For a smooth broadband spectrum, we can see that only 20 rings can do a perfect reconstruction. By adding 1% of noise on detector, there appears a little noise on the reconstructed spectrum, which can be smoothed out by solving minimize $\tau\|I-B\theta\|_2+\|\theta\|_1$ instead. (FIG. 26, FIG. 28).

FIG. 29 is a drawing showing Theorem 1.

Figure 30:
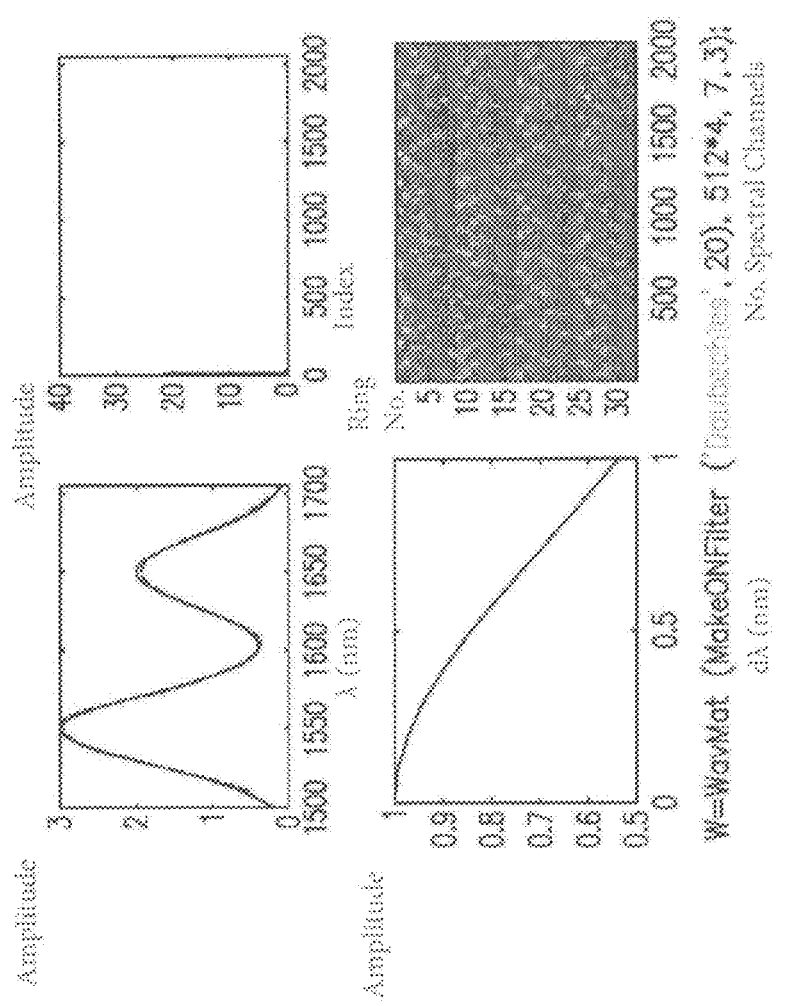
FIG. 30 is another drawing showing an exemplary broadband spectrum with corresponding spectral graph, DCT, spectral correlation graph, and calibration matrix.

FIG. 30 is another drawing showing an exemplary broadband spectrum with corresponding spectral graph, discrete cos transform (DCT), spectral correlation graph, and calibration matrix.

Figure 31:
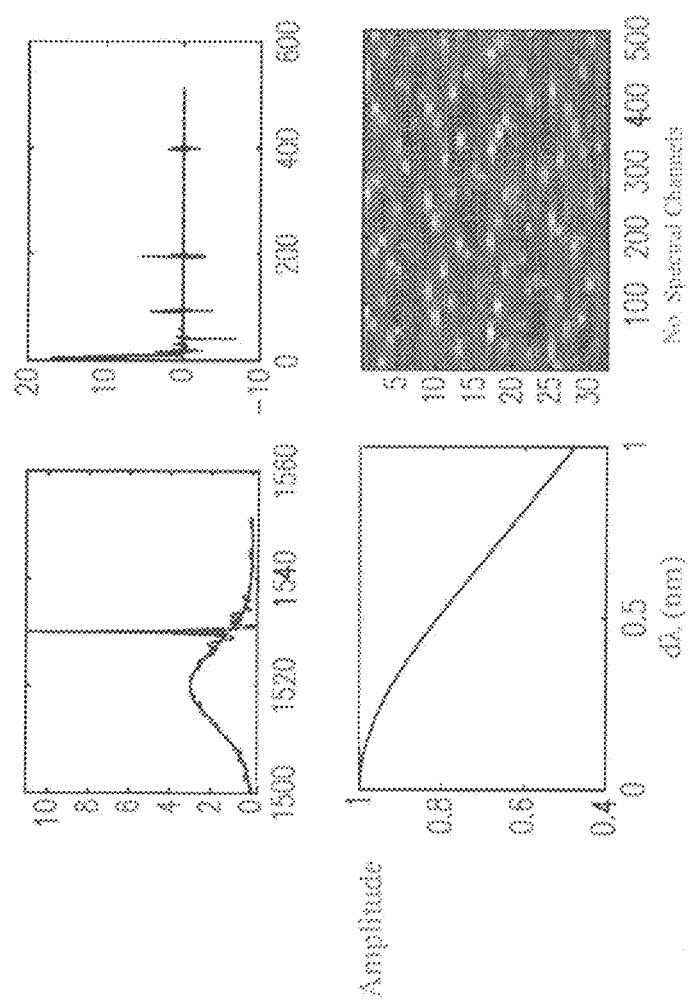
FIG. 31 is another drawing showing an exemplary broadband spectrum with corresponding spectral graph, DCT, spectral correlation graph, and calibration matrix.

FIG. 31 is another drawing showing an exemplary broadband spectrum with corresponding spectral graph, discrete cos transform (DCT), spectral correlation graph, and calibration matrix.

Figure 32:
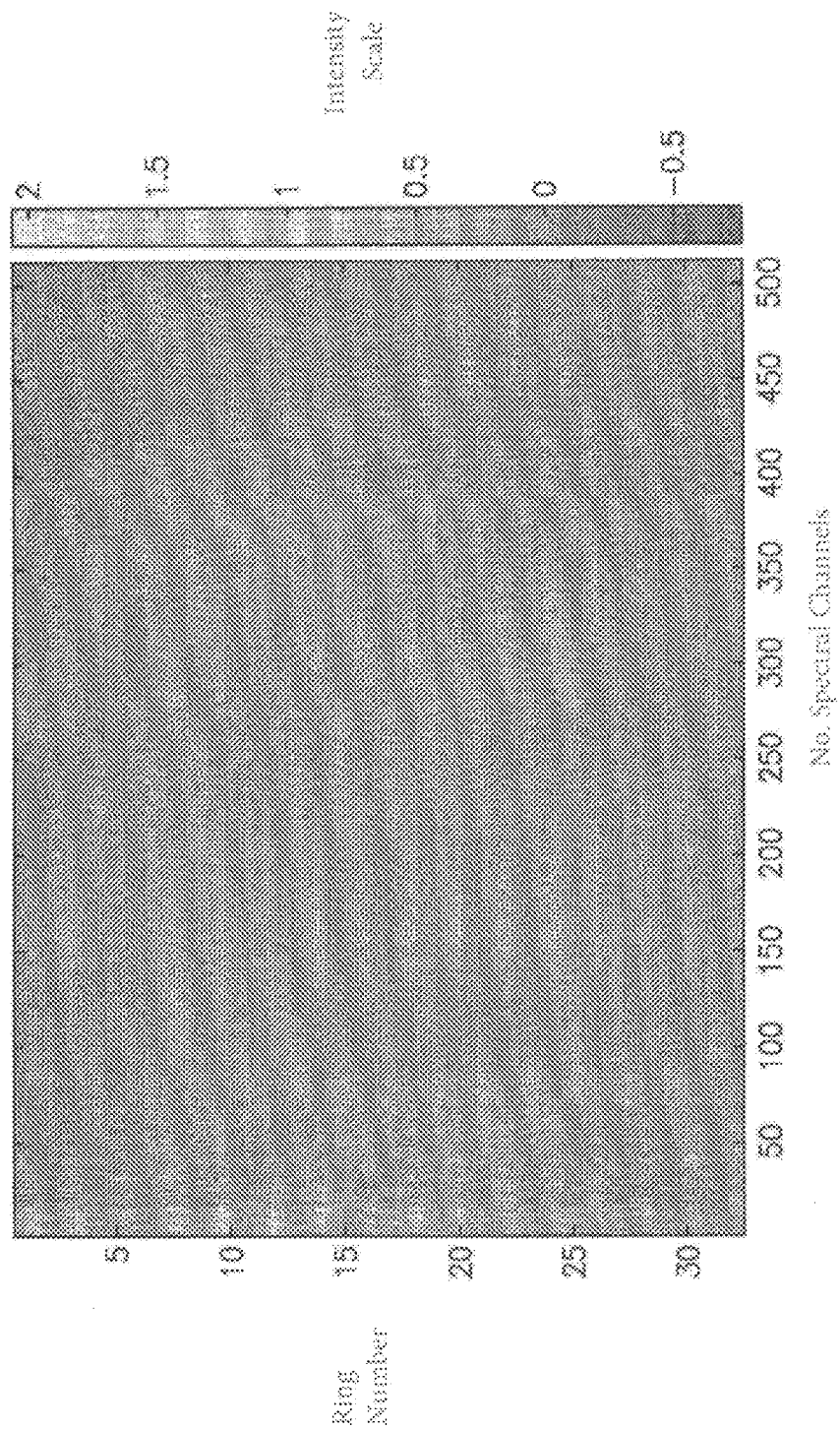
FIG. 32 is another drawing showing an exemplary matrix after multiplying the compressing operator.

FIG. 32 is another drawing showing an exemplary matrix after multiplying the compressing operator.

Code to model, and firmware and/or software to model, design, and/or operate a random ring photonic integrated circuit spectrometer according to the Application can be supplied on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc. firmware and/or software to operate a random ring photonic integrated circuit spectrometer according to the Application can be present on any suitable computer readable non-transitory storage medium as non-transitory data storage including any suitable memory chips, microcomputers with onboard embedded memory, FPGA, ASIC, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An integrated optical spectrometer comprising:
   an optical bus configured to accept a light to be measured;
   an array of integrated ring resonators and detectors, each ring resonator optically coupled to said optical bus and to at least one detector, and
   wherein each ring resonator in the array of ring resonators is an optical cavity; and
   a processor configured to perform a matrix multiplication process operatively coupled to each detector,
   wherein said matrix multiplication process determines a spectral content of the light to be measured based on data from said array of integrated ring resonators and detectors and a calibration matrix of said array of integrated ring resonators and detectors; and
   wherein said matrix multiplication process comprises an operation of decomposing an incoming spectrum of light into a linear combination of ring resonator modes,
   wherein the modes are the spectral content of light to be measured that resonates in the cavity of each ring resonator.

2. The integrated optical spectrometer of claim 1, wherein a compressed sensing algorithm, a number of ring resonators, and a sparsity of input spectrum determine a resolution and a spectral range of the integrated optical spectrometer.

3. The integrated optical spectrometer of claim 1, comprising a narrow spectral range high resolution mode by lining up resonances of ring resonators of said array of integrated ring resonators and detectors to sample a spectrum at a resolution of a resonance line-width.

4. The integrated optical spectrometer of claim 1, further comprising a plurality of micro heaters.

5. The integrated optical spectrometer of claim 4, wherein in a zoom mode, a plurality of ring resonator resonances is tuned by said micro heaters to sample a spectrum across a resonator spectral range at high resolution.

6. The integrated optical spectrometer of claim 4, wherein each micro heater is disposed directly above a ring resonator waveguide.

7. The integrated optical spectrometer of claim 5, wherein each micro heater is disposed in relation to a ring resonator waveguide so that said micro heater substantially does not contribute an optical loss from absorption due to modal interaction with a heater metal of said micro heater.

8. The integrated optical spectrometer of claim 1, comprising a CMOS compatible photonic platform based on silicon nitride.

9. The integrated optical spectrometer of claim 8, further comprising silicon dioxide, silicon, and germanium.

10. The integrated optical spectrometer of claim 1, comprising integrated silicon photodetectors responsive to a range from about 400 nm to 1000 nm.

11. The integrated optical spectrometer of claim 1, comprising germanium detectors responsive to a range from about 1000 nm to 1600 nm.

12. The integrated optical spectrometer of claim 1, comprising InAsSb detectors responsive to a range from about 1600 nm to 4000 nm.

13. A method of calibrating and operating an integrated optical spectrometer comprising:
   providing an optical bus configured to accept a light to be measured, and an array of integrated ring resonators and detectors, each ring resonator optically coupled to said optical bus and each ring resonator optically coupled to at least one detector, wherein each ring resonator in the array of ring resonators is an optical cavity;
   generating a calibration matrix for said array of integrated ring resonators and detectors by scanning at least once, a wavelength of the light to be measured with a spectral channel interval $d\lambda$; and
   decomposing an incoming spectrum of light into a linear combination of ring resonator modes to determine a spectral content of the light to be measured based on data from each detector of said array of integrated ring resonators and detectors and said calibration matrix.

14. The method of claim 13, wherein said step of decomposing further includes in a zoom mode, tuning by micro heaters a plurality of ring resonator resonances to sample a spectrum across a resonator spectral range at high resolution.

15. A method to generate a calibration matrix for an array of ring resonators of a photonic integrated circuit (PIC) spectrometer comprising:
   determining a spectrometer wavelength and bandwidth;
   determining a scanning interval $d\lambda$ by the full width half maximum (FWHM) of a spectral correlation function;
   tuning a tunable wavelength tunable light source or a wavelength selectable light source to a starting wavelength $\lambda_0$ with one unit of power, where a bandwidth of the tunable laser is smaller than $d\lambda$;
   recording data obtained from the array of ring resonators a set of detectors, wherein each ring resonator in the array of ring resonators has at least one detector optically coupled to it, and each ring resonator is an optical cavity, which data forms a first column of a calibration matrix;
   tuning the wavelength tunable light source or the wavelength selectable light source to a wavelength of $\lambda_0+d\lambda$ with the same amount of power;
   recording data from the detectors, which data forms a next column of the calibration matrix; and
   repeating the measurements of tuning the wavelength tunable light source or the wavelength selectable light source to a wavelength of $\lambda_0+d\lambda$ and recording data from the detectors to an end wavelength to complete the calibration matrix.

* * * * *